US012314289B2

(12) United States Patent
Tuteja et al.

(10) Patent No.: US 12,314,289 B2
(45) Date of Patent: May 27, 2025

(54) AGGREGATING DATA INGESTED FROM DISPARATE SOURCES FOR PROCESSING USING MACHINE LEARNING MODELS

(71) Applicant: CITIBANK, N.A., New York, NY (US)

(72) Inventors: Deepali Tuteja, Coppell, TX (US); Girish Wali, Flower Mound, TX (US); David Anandaraj Arulraj, Mason, OH (US)

(73) Assignee: CITIBANK, N.A., New York, NY (US)

( * ) Notice: Subject to any disclaimer, the term of this patent is extended or adjusted under 35 U.S.C. 154(b) by 53 days.

(21) Appl. No.: 18/123,179

(22) Filed: Mar. 17, 2023

(65) Prior Publication Data
US 2024/0311398 A1 Sep. 19, 2024

(51) Int. Cl.
*G06F 16/28* (2019.01)
*G06F 16/21* (2019.01)
*G06F 16/25* (2019.01)

(52) U.S. Cl.
CPC .......... *G06F 16/287* (2019.01); *G06F 16/213* (2019.01); *G06F 16/258* (2019.01)

(58) Field of Classification Search
CPC ..... G06F 16/287; G06F 16/258; G06F 16/213
USPC .............................................. 706/11; 707/737
See application file for complete search history.

(56) References Cited

U.S. PATENT DOCUMENTS

| | | | | |
|---|---|---|---|---|
| 5,963,948 A | * | 10/1999 | Shilcrat | G06F 16/748 707/999.1 |
| 6,489,968 B1 | * | 12/2002 | Ortega | G06F 16/954 715/713 |
| 9,779,147 B1 | * | 10/2017 | Sherman | G06F 16/2423 |
| 10,748,100 B1 | | 8/2020 | Boroumand et al. | |
| 10,789,526 B2 | * | 9/2020 | Wilson | H04L 67/568 |
| 11,187,546 B2 | * | 11/2021 | Rolf | G01C 21/3446 |
| 11,232,383 B1 | * | 1/2022 | Burns, Sr. | G06Q 10/0637 |
| 11,526,480 B2 | * | 12/2022 | Rolf | G01C 21/3453 |

(Continued)

FOREIGN PATENT DOCUMENTS

WO WO-2016/049799 A1 4/2016

OTHER PUBLICATIONS

Foreign Search Report on EP DTD Jul. 31, 2024.

*Primary Examiner* — Giovanna B Colan
(74) *Attorney, Agent, or Firm* — Foley & Lardner LLP

(57) ABSTRACT

Presented herein are systems and methods for aggregating data from disparate sources to output information. A computing system may transform a first plurality of datasets of a plurality of data sources by converting a first format of the corresponding data source for each of the first plurality of datasets to generate a second plurality of datasets in a second format of the computing system. The computing system may identify, from the second plurality of datasets, a subset of datasets using a feature selected for evaluation of a utility of the feature. The computing system may apply a machine learning model configured for the selected feature to the subset of datasets to generate an output that measures a likelihood of usefulness. The computing system may cause a visualization of the output for the feature to be displayed for presentation on a dashboard interface based on a template configured for the feature.

18 Claims, 21 Drawing Sheets

(56) References Cited

U.S. PATENT DOCUMENTS

| | | | |
|---|---|---|---|
| 2002/0130907 A1* | 9/2002 | Chi | G06F 16/954 |
| | | | 715/853 |
| 2004/0122803 A1* | 6/2004 | Dom | G06Q 50/01 |
| 2011/0169833 A1* | 7/2011 | Basak | G06T 11/20 |
| | | | 345/440 |
| 2011/0184945 A1* | 7/2011 | Das | G01C 21/36 |
| | | | 707/E17.014 |
| 2012/0131460 A1* | 5/2012 | Coyle-Gilchrist | G11B 27/034 |
| | | | 715/716 |
| 2015/0142796 A1* | 5/2015 | Floreskul | G06F 16/9024 |
| | | | 707/736 |
| 2016/0117602 A1* | 4/2016 | Hassanzadeh | G06F 16/285 |
| | | | 706/11 |
| 2017/0060989 A1* | 3/2017 | Shinkuma | H04L 45/02 |
| 2018/0224293 A1* | 8/2018 | Xu | G01C 21/30 |
| 2019/0287018 A1* | 9/2019 | Coupe | G06N 20/20 |
| 2019/0342194 A1* | 11/2019 | Mermoud | G06N 20/20 |
| 2021/0064595 A1* | 3/2021 | Lee | G06F 16/9024 |
| 2021/0342723 A1* | 11/2021 | Rao | G06Q 40/12 |
| 2021/0374866 A1* | 12/2021 | Garg | G06N 20/00 |
| 2021/0390395 A1* | 12/2021 | Ait-Mokhtar | G06F 40/30 |
| 2022/0053011 A1* | 2/2022 | Rao | G06F 21/577 |
| 2022/0292085 A1* | 9/2022 | Shahriar | G06N 20/00 |

\* cited by examiner

| Processes | Enterprise Process Count |
|---|---|
| L1 Process | 19 |
| L2 Process | 128 |
| L3 Process | 670 |

| Application Mapping to Processes | Enterprise Application Mapping Completed | Application Mapping Completed |
|---|---|---|
| CSI Mapping | 878 | 498 |

AGGREGATING DATA INGESTED FROM DISPARATE SOURCES FOR PROCESSING USING MACHINE LEARNING MODELS

TECHNICAL FIELD

This application generally relates to managing databases in networked environments. In particular, the present application relates to aggregating data ingested from disparate sources for centralized processing using machine learning (ML) models.

BACKGROUND

In a computer networked environment, various processes, applications, or services running on servers, clients, and other computing devices may produce an immense amount of data. The data from these sources may be communicated over the network for storage across a multitude of databases. Each database may be designated for storing and maintaining data for a single or a subset of processes, even within an application or service. Furthermore, each database may arrange and maintain pieces of this data in accordance with the specifications of the database, independently of other databases. Because the data is stored across multiple databases each with its own specifications, a network administrator may have to access each individual database to gain any visibility into a portion of processes in the network. As a result, the network administrator may be left with a myopic view of the overall network, as it may be difficult for the administrator to obtain insight into multiple aspects of applications accessed through the network from accessing individual databases. This issue may be exacerbated with the immense quantity of data stored across a myriad of different databases. Due to this difficulty in accessing data across the myriad of databases, any problems or issues affecting the performance of the processes, applications, or services accessed through the network may remain undiagnosed and unaddressed.

SUMMARY

Disclosed herein are systems and methods for aggregating data from disparate sources to process and output information using machine learning (ML) models. Through a network environment (e.g., an enterprise including data center, branch offices, and remote users), end-users on client devices may access applications hosted on a multitude of servers. In this environment, the processes of one application may affect or be related to the processes of other applications within the network. In connection with running processes of the applications, the servers may produce vast quantities of data. The servers may provide the produced data for storage across a variety of databases. Even for a single application, the servers may store the data on different databases depending on the type of operation carried out for the application. Each database may store and maintain the data in accordance with its own different or disparate specifications, such as those for arrangement, formatting, and content, among others.

A user may view the data from these databases for further analysis and diagnosis in an attempt to gain insight into the operations of the applications or servers across the network environment. Because the data for a particular application or set of processes is stored in different databases, the user may have to resort to accessing individual databases to retrieve the data maintained therein. For instance, a network administrator may have to access a specific server for a certain application to obtain performance-related metrics for the application. Expanding this to metrics for applications accessible through the network, the user may have to manually retrieve the data from a myriad of databases associated with different operations or applications.

As a consequence, it may be very difficult for the user to gather holistic information across multiple applications or servers within the network environment (e.g., across an enterprise), resulting in the user having to spend enormous tedious and manual efforts to fetch the data from different databases. Even when the data is collected, the data may not be ready for immediate use, because the retrieved data may be stored in a different manner using particular formatting and specifics. Due to the inability to access data across multiple databases, any issues or problems affecting performance across multiple applications or servers within the network may remain undetected or unresolved. These issues may be exacerbated by the fact that while processes of one application may affect the processes of another or the same application, the data stored across multiple databases may not reflect these relationships.

To address these and other technical problems, a service may aggregate data from multiple data sources of the network environment using machine learning (ML) models in order to output information. The server may establish and maintain a set of ML models to provide various outputs regarding the data of the environment, such as application function, application deployment, risk assessment, or project key performance indicators, among others. The ML models may include models trained in accordance with supervised learning (e.g., an artificial neural network (ANN), decision tree, regression model, Bayesian classifier, or support vector machine (SVM)) and models trained in accordance with unsupervised learning (e.g., clustering models), among others.

The service may access multiple databases to ingest the data therein over a sampling period. With the aggregation of the data, the service may transform the data for input into one of the ML models. As part of the transformation, the service may convert the formatting of the data from the original of the data source to a formatting compatible for inputting into one the ML models. The service may also automatically perform correction and augmentation of the data from other sources. The service may generate category tags for each piece of data based on the contents therein, with each category tag for one or more of the ML models. The service may group or segment the data by category tags for storage prior to input. The groups of data may be from multiple data sources and in a format compatible for input into one of the ML models maintained by the service.

For a given group of transformed data, the service may select a ML model from the set to apply. The selection may be based on the category tag associated with the group. For instance, the service may maintain one ML model to process application data (e.g., with application process category tags) and another ML model to process financial data (e.g., with financial transaction category tags). With the selection, the service may feed the group of data as input into the ML model and process the data in accordance with the weights of the ML model to produce an output. Under learning mode, the service may use the output to further train the ML model, for example, by updating the weights of the model using a loss between the produced output and the expected output. The service may use data from previous sampling periods as part of training and validation to refine the ML model.

Under runtime mode, the service may generate a visualization of the output from the ML model using a template for the type of output. The template may define the visualization of information as identified in the output from the ML model for fast and easy comprehension by the user viewing the visualization. The visualization may be may be in the form of a bar graph, pie chart, histogram, or Venn diagram, other graphic for presenting insights and analytics for various operations and applications in the network environment. With the visualizations, the user may be able quickly assess and pinpoint any problems or potential risks affecting the performance of applications or processes on servers across the network.

In this manner, the service may provide for an automated data analysis to reduce the amount of time and effort spent by users in attempting to manually track down, fetch, and evaluate data. Since the data originally stored across multiple databases can be retrieved, transformed, and processed by the service to provide outputs regarding the data, any issues with applications or processes whose data is stored across these databases can now be detected. Combined with the visualization of the output from the ML models using templates, a user may be able to readily and quickly assess any such problems or risks in the network. Furthermore, with the use of data from prior sampling periods to train and update the ML models, the service may be able to provide more accurate and refined outputs for the data retrieved from these sources. As such, problems or risks affecting the performance of applications or processes on servers across the network (e.g., across an enterprise) may be pinpointed and addressed. This may also improve the overall performance of the servers and client devices in the network, for instance, by reducing the computer and network resources tied up due to previously undetectable issues.

Aspects of present disclosure are directed to systems, methods, and non-transitory computer readable media for aggregating data from disparate sources to output information. A computer system may maintain a plurality of machine learning (ML) models configured for evaluating a plurality of feature. The computing system may transform a first plurality of datasets of a plurality of data sources over a first time period by converting a first format of the corresponding data source for each of the first plurality of datasets to generate a second plurality of datasets in a second format of the computing system and configured for input to one of the plurality of ML models. The computing system may identify from the second plurality of datasets, a subset of datasets using a feature selected from the plurality of features for evaluation of a utility of the feature. The computing system may apply an ML model of the plurality of ML models configured for the selected feature to the subset of datasets to generate an output that measures a likelihood of usefulness. The ML model may be trained using a third plurality of datasets for the feature from the plurality of data sources over a second time period. The computing system may cause a visualization of the output for the feature to be displayed for presentation on a dashboard interface based on a template configured for the feature.

In one embodiment, the computing system may receive, via the dashboard interface, a selection of a plurality of categories for the plurality of features to be evaluated. The computing system may generate a tag identifying a category of the plurality of categories for each dataset of the second plurality of datasets. The computing system may identify the subset of datasets using the tag identifying the category of each dataset of the second plurality of datasets.

In another embodiment, the computing system may determine that more data is to be added to the subset of datasets for evaluating the utility of the feature. The computing system may retrieve a second subset of data from the second plurality of datasets to supplement the subset of datasets.

In yet another embodiment, the computing system may retrieve a fourth plurality of datasets from the plurality of data sources over a third time period. The computing system may identify a subset of ML models from the plurality of ML models corresponding to a subset of features from the plurality of features present in the fourth plurality of datasets. The computing system may re-train the subset of the plurality of ML models using the fourth plurality of datasets.

In yet another embodiment, the computing system may generate from the second plurality of datasets a plurality of subsets of data corresponding to the plurality of ML models for evaluating the corresponding plurality of features. The computing system may identify the subset from the plurality of subsets based on the feature selected from the plurality of features.

In yet another embodiment, the computing system may receive, via the dashboard interface, a selection of the feature from the plurality of features to be evaluated for utility. The computing system may select, from the plurality of ML models, the ML model to be applied to the subset of datasets based on the selection of the feature.

In yet another embodiment, the computing system may retrieve the first plurality of datasets from the plurality of data sources for one or more applications over the first time period. Each of the first plurality of datasets may identify at least one of a function type, a usage metric, a security risk factor, or a system criticality measure. The computing system may identify, from the second plurality of datasets transformed from the first plurality of datasets, a second subset of datasets and a third subset of datasets for evaluation of the an application of the one or more applications. The computing system may train the ML model configured for evaluating the one or more applications using the second subset of dataset. The computing system may validate the ML model using the third subset of datasets.

In yet another embodiment, the computing system may apply the ML model to the subset of datasets to generate the output to identify whether the application is deprecated from use. The computing system may cause the visualization of the output for the identification of whether application is deprecated. In yet another embodiment, the computing system may maintain the plurality of ML models comprising a first subset of ML models trained in accordance with supervised learning and a second subset of ML models trained in accordance with unsupervised learning. In yet another embodiment, the computing system may identify, from a plurality of templates corresponding to the plurality of features, a template corresponding to the feature to use for generating the visualization of the output.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

FIGS. 7A-C depict screenshots of information on processes and application mapping presented on a dashboard interface in accordance with an illustrative embodiment;

DETAILED DESCRIPTION

Figure 1:
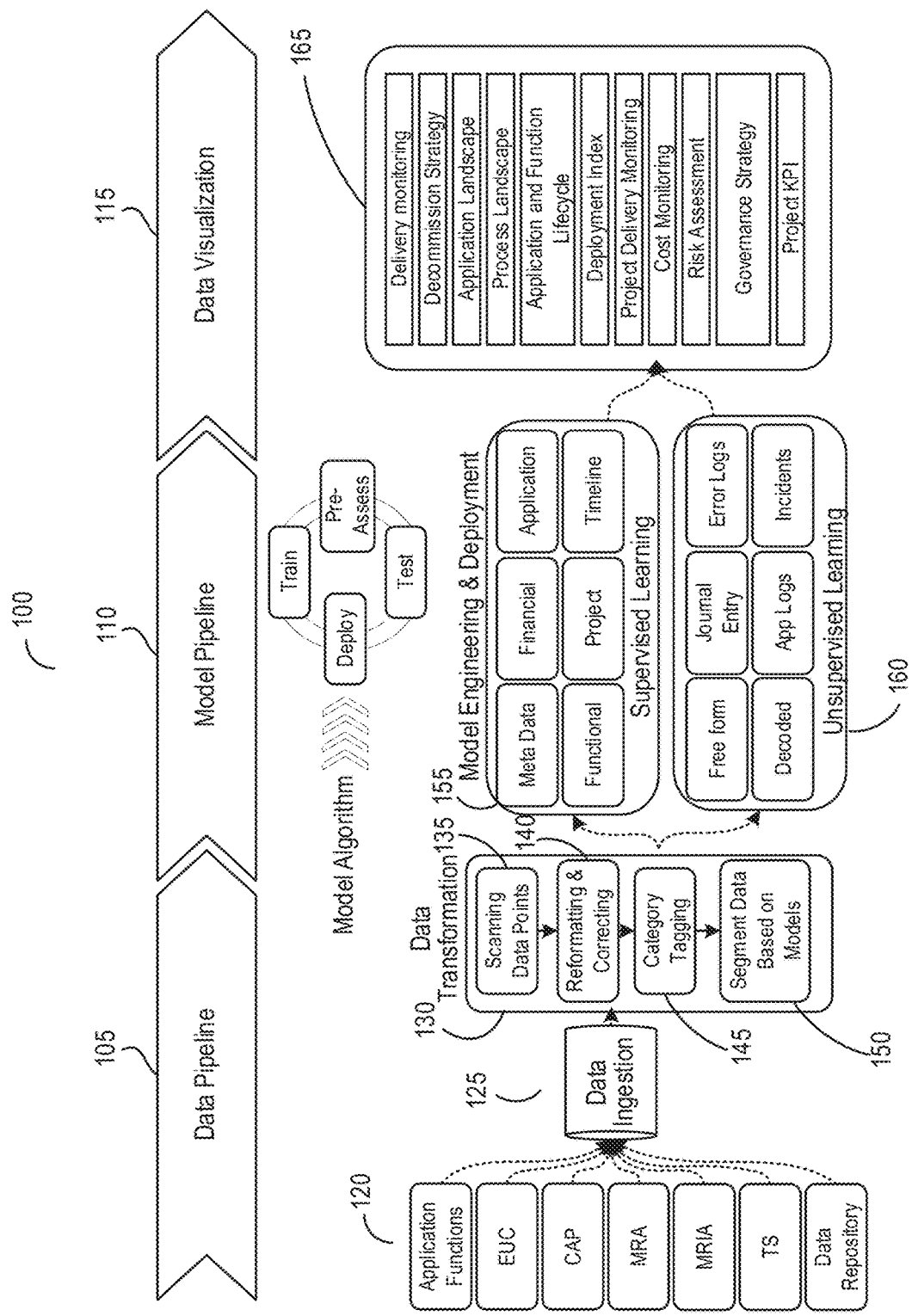
FIG. 1 depicts a block diagram of a platform for aggregating and visualizing data from disparate sources in accordance with an illustrative embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, as well as additional applications of the principles as illustrated here, which would occur to a person skilled in the relevant art and having possession of this disclosure, are to be considered within the scope of the disclosure.

The present disclosure is directed to systems and methods for aggregating data from multiple data sources of the network environment to output information using ML models. The server may establish and maintain a set of ML models to provide various outputs regarding the data of the environment. The service may access multiple databases to perform ingestion of the data therein over a sampling period for the applications and processes of the network environment. With the aggregation of the data, the service may transform the data to make the data compatible for input into one of the ML models. For a given group of transformed data, the service may select a ML model from the set to apply. With the selection, the service may feed the group of data as input into the ML model and process the data in accordance with the weights of the ML model to produce an output. Under runtime mode, the service may generate a visualization of the output from the ML model using a template for the type of output. The visualization may be used to present insights and analytics for various operations and applications in the network environment.

FIG. 1 depicts a block diagram of a platform 100 for aggregating and visualizing data from disparate sources. The platform 100 may carry out or include a data pipeline 105, a model pipeline 110, and a data visualization 115, among others. In the data pipeline 105, the platform 100 may access data sources for retrieval of various pieces of data 120. In the depicted example, the data may include application function, end-user computing (EUC), corrective action plan (CAP), matters requiring attention (MRA), matters requiring immediate attention (MRIA), trading service (TS), and other data repositories, among others. With the retrieval, the platform 100 may perform data ingestion to store on a database 125. The platform 100 may perform a data transformation as part of the data ingestion 130. In transforming, the platform 100 may scan data points 135, reformat and correct the data 140, generate category tags 145, and segment data based on models 150, among others.

Continuing on, in the model pipeline 110, the platform 100 may maintain a set of ML models, including one subset of models established in accordance with supervised learning 155 and another subset of models established in accordance with unsupervised learning 160. Based on the segment to which the data is assigned, the platform 100 may select one of the ML models to apply to the data to produce an output. Under training mode, the platform 100 may use the output to train and update the weights of the models. Under evaluation or runtime mode, the platform 100 may further use the output to provide to the end user. Under data visualization 115, the platform 100 may use the output to generate visualizations to present on a dashboard interface. The generation of the visualization may be in accordance with a template for the type of output, such as delivery monitoring, decommissioning, application landscape, process landscape, application and function lifecycle, deployment index, project delivery monitoring, cost monitoring, risk assessment, governance strategies, and project key performance indicator (KPI), among others.

Figure 2:
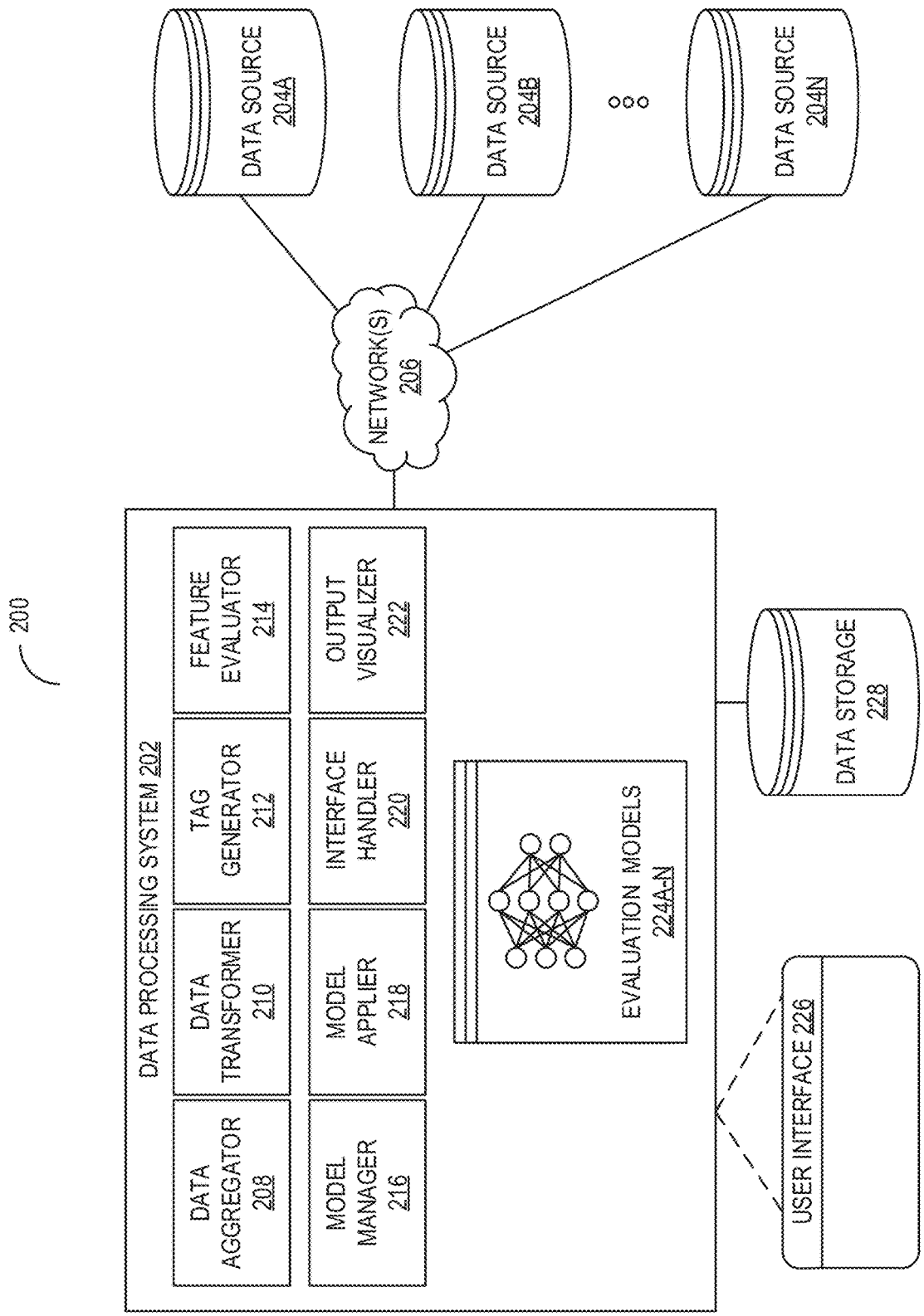
FIG. 2 depicts a block diagram of a system for aggregating data from disparate sources to output information using machine learning (ML) models in accordance with an illustrative embodiment.

FIG. 2 depicts a block diagram of a system 200 for aggregating data from disparate sources to output information using ML models. The system 200 may include at least one data processing system 202 (sometimes referred herein generally as a computing system or a service) and a set of data sources 204A-N (hereinafter generally referred to data sources 204), among others, communicatively coupled with one or more networks 206. The data processing system 202 may include at least one data aggregator 208, at least one data transformer 210, at least one tag generator 212, at least one feature evaluator 214, at least one model manager 216, at least one model applier 218, at least one interface handler 220, at least one output visualizer 222, and a set of evaluation models 224A-N (hereinafter generally referred to as evaluation models 224), among others. The data processing system 202 may provide at least one user interface 226, among others. The data processing system 202 may include or may have accessibility to at least one data storage 228.

Various hardware and software components of one or more public or private networks 206 may interconnect the various components of the system 200. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols, among others.

The data processing system 202 may be any computing device comprising one or more processors coupled with memory and software and capable of performing the various processes and tasks described herein. The data processing system 202 may be in communication with the data sources 204, among others via the network 206. Although shown as a single component, the data processing system 202 may include any number of computing devices. For instance, the data aggregator 208, the data transformer 210, the tag generator 212, the feature evaluator 214, the model manager 216, the model applier 218, the interface handler 220, and the output visualizer 222 may be executed across one or more computing systems 202.

Within the data processing system 202, the data aggregator 208 may retrieve data from one or more of the data sources 204. The data transformer 210 may perform pre-processing on the retrieved data. The tag generator 212 may generate tags identifying topic categories for data. The feature evaluator 214 may group the data using the tags identifying the categories. The model manager 216 may train, establish, and maintain the evaluation models 224. The model applier 218 may feed and process the data using at least one of the evaluation models 224. The interface handler 220 may manage inputs and output via the user interface 226. The output visualizer 222 may generate visualization using the output from the evaluation models 224. The data source 228 may store and maintain data for use by the components of the data processing system 202.

Each data source 204 may store and maintain various datasets associated with servers, client devices, and other computing devices in a network environment (e.g., the networks 206). In some embodiments, the network environment may correspond to an enterprise network for a group of end-users including at least one data center, one or more branch offices, and remote users. The data source 204 may include a database management system (DBMS) to arrange and organize the data maintained thereon. The data on the data source 204 may be produced from a multitude of applications and processes accessible through the network environment. The applications may be an online banking application, a securities trading platform, a word processor, a spreadsheet program, a multimedia player, a video game, or a software development kit, among others. For instance, the data source 204 may store and maintain a transaction log identifying communications exchanged over the network environment, such as between end-user client devices and the servers. Upon production, the servers or end-user client devices may store and maintain the data on the data source 204. The data source 204 may store and maintain the data in accordance with its own specifications, such as formatting and contents of the data. The data maintained on the data source 204 may be accessed by the data processing system 202.

Figure 3:
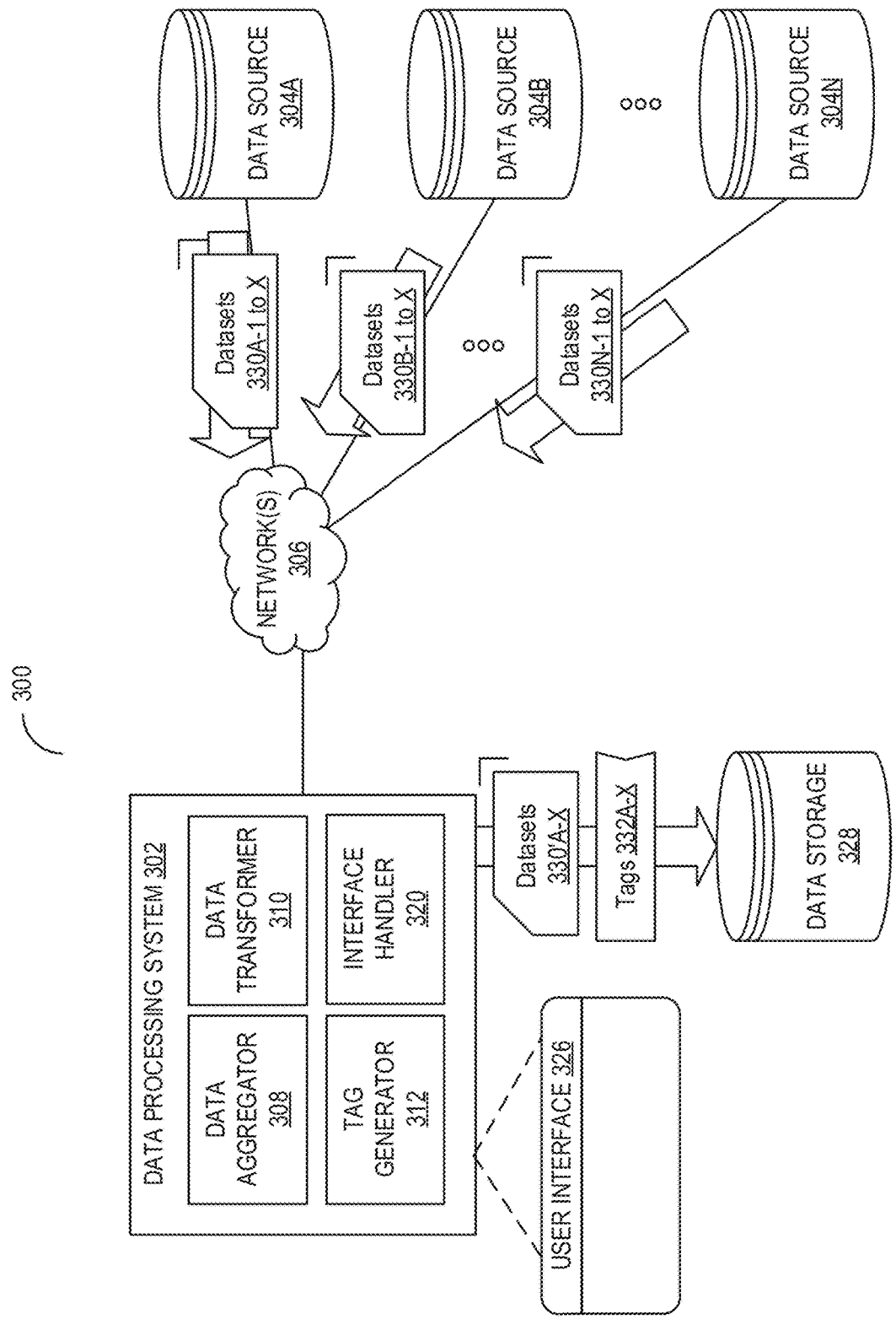
FIG. 3 depicts a block diagram of a system for aggregating data from disparate sources in accordance with an illustrative embodiment.

FIG. 3 depicts a block diagram of a system 300 for aggregating data from disparate sources. The system 300 may include at least one data processing system 302 and one or more data sources 304A-N (hereinafter generally referred to as data sources 304), communicatively coupled with one another via at least one network 306. The data processing system 302 may include at least one data aggregator 308, at least one transformer 310, at least one tag generator 312, at least one interface handler 320, and at least one data storage 328, among others. The data processing system 302 may provide at least one user interface 326. Embodiments may comprise additional or alternative components or omit certain components from those of FIG. 3 and still fall within the scope of this disclosure. Various hardware and software components of one or more public or private networks 306 may interconnect the various components of the system 300.

Each component in system 300 (such as the data processing system 302 and its subcomponents and the one or more data sources 304) may be any computing device comprising one or more processors coupled with memory and software and capable of performing the various processes and tasks described herein.

Each data source 304 may store and maintain one or more datasets 330A-1 to 330N-X (hereinafter generally referred to datasets 330). The data source 304 may accept, obtain, or otherwise receive the datasets 330 from one or more servers or client devices in a network environment. Each data source 304 may store and maintain the datasets 330 for one or more applications or processes accessible via the network environment. For instance, the first data source 304A may store datasets 330 related to an account balance check operation of an online banking application, whereas the second data source 304B may store datasets 330 associated with an institutional risk management platform. In another example, one or more of the data sources 304 may store and maintain datasets 330 such as a function type, a usage metric, a security risk factor, or a criticality indicator, among others.

The datasets 330 may be stored and maintained in accordance with the specification of the data source 304. The specifications may include, for example, a formatting and contents for the datasets 330. The formatting may identify, specify, or otherwise define a structure of the datasets 330 stored on the data source 304. For instance, the formatting may define a file format or database model for storing and arranging the datasets 330 in the data source 304. The contents may identify, specify, or otherwise define a type of data for the datasets 330 stored on the data source 304. For example, the specified content may define types of fields (sometimes referred herein as attribute or key) and corresponding values in the datasets 330. The specifications for the dataset 330 in one data source 304 may differ from the specifications (e.g., at least one of formatting or content type) for the dataset 330 of another data source 304. For instance, the first data source 304A may have specifications that datasets 330 are to be in the form of field-value pairs for customer relationship management, whereas the second data source 304B may have specifications that datasets 330 may be in the form of a transaction log for invocation of operations of a particular application.

The data aggregator 308 executing on the data processing system 302 may access each data source 304 to obtain, identify, or otherwise retrieve the datasets 330 from the data source 304. In some embodiments, the data aggregator 308 may accept or receive the datasets 330 sent from each data source 304. The datasets 330 retrieved by the data aggregator 308 may correspond to datasets 330 generated or stored by the data source 304 over a period of time. The period of time may correspond to a sampling window over which the datasets 330 were generated at each data source 304. The period of time may span any amount of time, for example, from a 5 minutes to 2 months since the previous retrieval of the datasets 330 from the data sources 304. In some embodiments, the data aggregator 308 may instruct, command, or otherwise request the datasets 330 from each data source 304 for the specified period of time. With the retrieval, the data aggregator 308 may store and maintain the datasets 330 retrieved from the data sources 304 in the data storage 328 in the original specifications for the datasets 330. The data aggregator 308 may also perform initial scanning of the datasets 330 retrieved from the data sources 304.

With the retrieval, the data transformer 310 executing on the data processing system 302 may perform one or more transformations on the datasets 330. When received, the datasets 330 may initially be in the original specifications (e.g., formatting and content type) of the data source 304. For each dataset 330, the data transformer 310 may change, modify, or otherwise convert the format of the dataset 330 from the original format to at least one format of the data processing system 302 to generate a corresponding new dataset 330'A-X (hereinafter generally referred to as dataset 330'). In some embodiments, the data transformer 310 may generate the new dataset 330' using multiple datasets 330 from one or more data sources 304. The format for the new dataset 330' may be for entry, feeding, or input to one of the evaluation models of the data processing system 302. The format for the new dataset 330' may differ from the original format of the dataset 330. In some embodiments, the data transformer 310 may select or identify the format from a set of formats to convert to based on any number of factors, such as the data source 304 or the contents of the original datasets 330, among others. For example, the data transformer 310 may identify the data source 304 as associated with application log data, and may select the format for processing the application log data at the data processing system 302.

Continuing on, the data transformer 310 may perform data correction on the datasets 330' (or datasets 330). With the conversion, the dataset 330' may include one or more fields for which there are no values from the original corresponding dataset 330. For each dataset 330', the data transformer 310 may identify or determine whether more data is to be added to the dataset 330'. If there are no missing values in the dataset 330', the data transformer 310 may determine that no supplemental data is to be added to the dataset 330'. With the determination, the data transformer 310 may maintain the dataset 330' as is. On the contrary, if there is any portion of the dataset 330' with missing values, the data transformer 310 may determine that more data is to be added to the dataset 330'. The data transformer 310 may continue to traverse through the datasets 330' to determine whether more data is to be added.

With the determination that more data is to be added, the data transformer 310 may generate, identify, or retrieve supplemental data to add to the dataset 330'. In some embodiments, the data transformer 310 may identify associated datasets 330' for the supplemental data. For example, the dataset 330' with the missing values may be associated with a particular application. In this case, the data transformer 310 may retrieve or identify other datasets 330' also associated with the application to retrieve the supplemental data. With the retrieval, the data transformer 310 may add the supplemental data to the dataset 330'. In some embodiments, the data transformer 310 may determine or generate the supplemental data using other values in the dataset 330'. For example, the dataset 330' may have missing values for fields that can be derived from values of other fields in the same dataset 330'. Based on the other values, the data transformer 310 may generate the supplemental data to insert into the dataset 330'. In some embodiments, the data transformer 310 may access or search a knowledge base for the supplemental data to add to the dataset 330'. The knowledge base may be constructed using information from the network environment (e.g., the enterprise network) besides the data sources 304, and may include information about the network environment.

The tag generator 312 executing on the data processing system 302 may determine or generate at least one tag 332A-X (hereinafter generally referred to tag 332) for each dataset 330' (or dataset 330). The tag 332 may define or identify a topic category of the associated dataset 330'. The topic categories may include, for example, delivery monitoring, decommissioning, application landscape, process landscape, application and function lifecycle, deployment index, project delivery monitoring, cost monitoring, risk assessment, governance strategies, and project key performance indicator (KPI), among others. The topic categories may correspond to features to be evaluated using one or more ML models for outputting information on the datasets 330'. The tag 332 may be generated and maintained using one or more data structures, such as an array, a linked list, a tree, a heap, or a matrix, among others.

To identify the topic category, the tag generator 312 may process or parse the fields or values within the dataset 330' using natural language processing (NLP) algorithms, such as automated summarization, text classification, or information extraction, among others. In some embodiments, the tag generator 312 may generate the tag 332 based on the data source 304 from which the dataset 330 is retrieved. For example, the tag generator 312 may identify the topic category for the dataset 330' as for application-related metrics based on an identification of the data source 304 as storing data for one or more applications in the network environment. With the identification, the tag generator 312 may generate the tag 332 to identify the topic category for the dataset 330'.

In some embodiments, the tag generator 312 may identify or select the topic category from a set of candidate topic categories for the datasets 330' retrieved from the data sources 304. The tag generator 312 in conjunction with the interface handler 320 may retrieve, identify, or otherwise receive the set of candidate topic categories via the user interface 326. The interface handler 320 may provide the user interface 326 for presentation on a display coupled with the data processing system 302 or a computing device (e.g., administrator's computing device) in communication with the data processing system 302. The user interface 326 may include one or more user interface elements for defining the candidate topic categories. Upon entry or input via the user interface 326 (e.g., by the user), the interface handler 320 may retrieve or identify the definitions for the topic categories.

With the definitions, the tag generator 312 may compare with the fields and values of each dataset 330' (or dataset 330) with the set of candidate topic categories. The comparison may be facilitated using NLP techniques as discussed above. Based on the comparison, the tag generator 312 may identify or select the topic category to use as the tag 332 for the dataset 330'. For instance, the tag generator 312 may use a knowledge graph to compare the topic category derived from the dataset 330' with the candidate topic categories to calculate a semantic distance. The tag generator 312 may select the candidate topic category with the closest semantic distance with the derived topic category to use for the tag 332 for the dataset 330'. In some embodiments, the tag generator 312 may generate or generate a segment corresponding to a group of datasets 330'. The segment may be defined using the common topic category identified in the tags 332 of the subset of datasets 330'.

Upon generation, the tag generator 312 may store and maintain the tags 332 along with the datasets 330' on the data storage 328. In some embodiments, the tag generator 312 may insert or add the tags 332 to the datasets 330'. For instance, the tag generator 312 may add the tag 332 as a field-value pair along with other field-value pairs of the associated dataset 330'. In some embodiments, the tag generator 312 may determine or generate at least one association between the tag 332 and the corresponding dataset 330' from which the tag 332 was generated. The tag generator 312 may store the association on the data storage 328. In some embodiments, the tag generator 312 may store the segment corresponding to group of datasets 330' defined using the common topic category of tags 332 of each dataset 330' in the group. The tag generator 312 may store and maintain an association between the segment of the datasets 330' with the tag 332 on the data storage 318.

Figure 4:
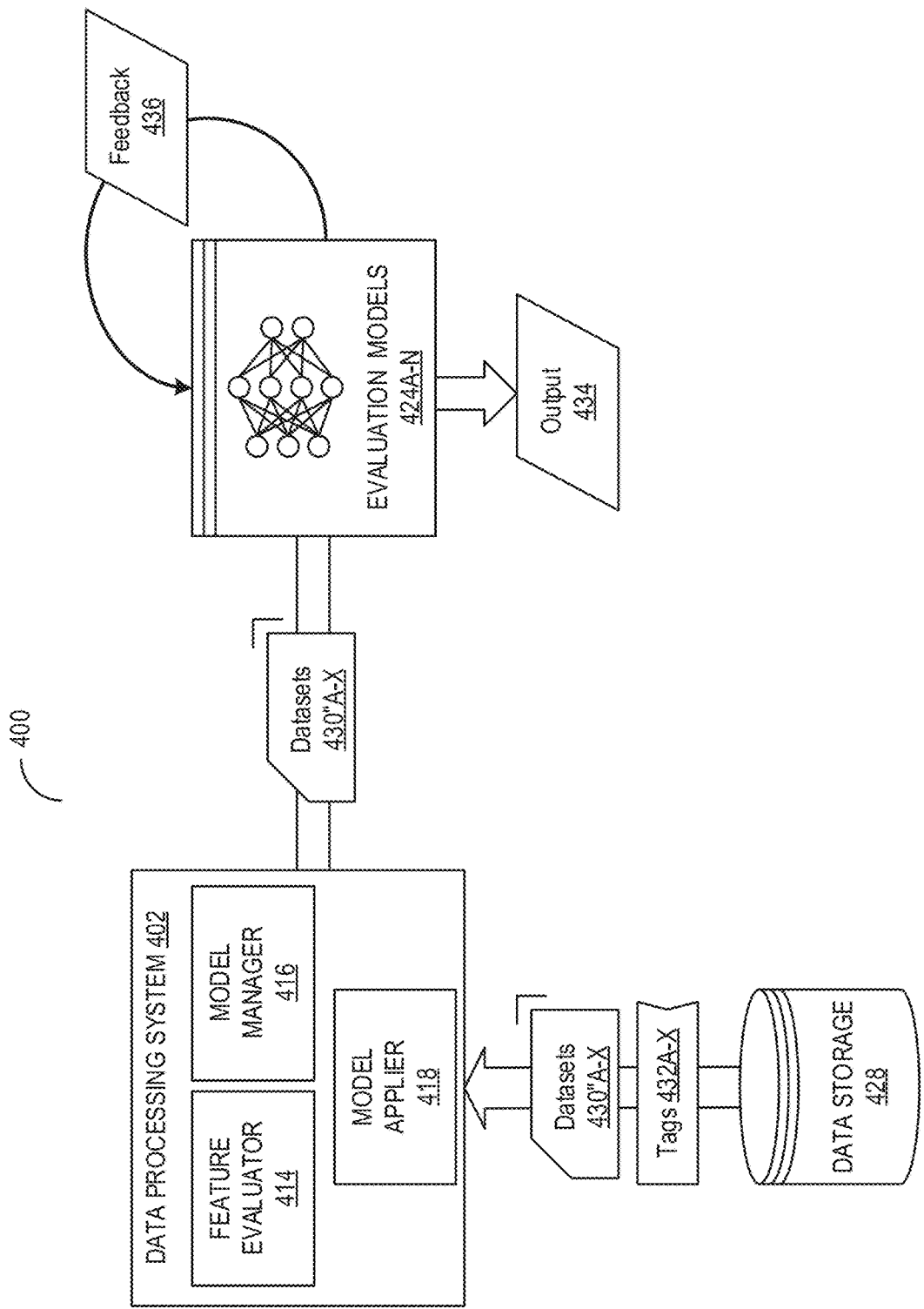
FIG. 4 depicts a block diagram of a system for training ML models using aggregated data in accordance with an illustrative embodiment.

FIG. 4 depicts a block diagram of a system 400 for training ML models using aggregated data. The system 400 may include at least one data processing system 402. The data processing system 402 may include at least one feature evaluator 414, at least one model manager 416, at least one model applier 418, one or more evaluation models 424A-N (hereinafter generally referred to as evaluation models 424), and at least one data storage 428, among others. In the system 400, the data processing system 402 and its components may be in a training or learning mode to train at least one of the evaluation models 424. Embodiments may comprise additional or alternative components or omit certain components from those of FIG. 4 and still fall within the scope of this disclosure. Various hardware and software components of one or more public or private networks may interconnect the various components of the system 400. Each component in system 400 (such as the data processing system 402 and its subcomponents) may be any computing device comprising one or more processors coupled with memory and software and capable of performing the various processes and tasks described herein.

The feature evaluator 414 executing on the data processing system 402 may identify or select a subset of datasets 430"A-X (hereinafter generally referred to as datasets 430") using at least one feature for evaluation using at least one of the evaluation models 424. The feature may correspond to at least one topic category for the datasets 430" to be evaluated or analyzed for at least one metric, such as utility, risk level, performance, health, among others. The utility may indicate a degree of usefulness of the feature evaluated. The risk level may correspond to a degree of vulnerabilities or susceptibility to lapses (e.g., security, downtime, failure, or breakdown) from the feature assessed. The performance may be a metric indicating proper functioning of components of the feature evaluated. The health may correspond to a condition of the features evaluated. The subset of datasets 430" may be obtained, received, or otherwise retrieved from over a period of time. The period of time may correspond to a sampling window over which the datasets were generated at each data source. The datasets 430" may be converted into the format compatible for inputting into the evaluation model 424.

In some embodiments, the feature evaluator 414 may select or identify the subset of datasets 430" using the at least one tag 432. The tag 432 may identify the topic category for each associated dataset 430". The topic category defined by the tag 432 may correspond to the feature to be evaluated for the metric (e.g., utility or risk level). The feature evaluator 414 may traverse through the set of possible topic categories identified across the tags 432 of the data storage 428 to identify corresponding subsets of datasets 430". In some embodiments, the feature evaluator 414 may identify the subset of datasets 430" using the corresponding period of time to be evaluated for the network environment. In some embodiments, the feature evaluator 414 may produce or generate a segment corresponding to the subset of datasets 430". The segment may be defined using the feature or by extension the common topic category identified in the tags 432 of the subset of datasets 430". In some embodiments, the feature evaluator 414 may identify the segment corresponding to the subset of datasets 430" (e.g., previously defined by the tag generator) stored on the data storage 428.

In conjunction, the model manager 416 executing on the data processing system 402 may initialize, establish, and maintain the set of evaluation models 424. The set of evaluation models 424 may be for evaluating or analyzing the corresponding set of features. Each evaluation model 424 may correspond to at least one of the topic categories present in the tags 432 of the datasets 430". Each evaluation model 424 may be dedicated or otherwise configured to process datasets 430" of the feature and by extension the associated topic category of the tag 432. In general, each evaluation model 424 may have: at least one input corresponding to the subset of datasets 430", at least one output from processing the input, and a set of parameters (e.g., weights) to process the inputs to generate the output. To train the evaluation model 424, the model manager 416 may invoke the model applier 418 to apply the identified datasets 430".

At least one of the evaluation models 424 may be initialized, trained, or established in accordance with supervised learning. For example, the evaluation model 424 may be an artificial neural network (ANN), decision tree, regression model, Bayesian classifier, or support vector machine (SVM), among others. At least one of the evaluation models 424 may be initialized, trained, or established in accordance with unsupervised learning. For instance, the evaluation model 424 may be a clustering model, such as hierarchical clustering, centroid-based clustering (e.g., k-means), distribution model (e.g., multivariate distribution), or a density-based model (e.g., density-based spatial clustering of applications with noise (DBSCAN)), among others. Other techniques may be used to initialize, train, and establish the evaluation models 424, such as weakly supervised learning, reinforcement learning, and dimension reduction, among others.

In some embodiments, the model manager 416 in conjunction with the feature evaluator 414 may identify or select the evaluation model 424 from the set of evaluation models 424 to be trained. The selection may be based on the subset of datasets 430", the feature to be evaluated, or the topic category identified in the tags 432 of the selected subset, among others. For instance, each evaluation model 424 may be dedicated or configured to process subsets of datasets 430" for a particular feature or by extension category topic. The model manager 416 may identify the evaluation model 424 to be used to process the identified subset of datasets 430". In some embodiments, the model manager 416 may determine whether an evaluation model 424 exists or is otherwise established for the feature. If the evaluation model 424 does not exist, the model manager 416 may create and initialize the evaluation model 424. For example, the model manager 416 may instantiate the evaluation model 424 for processing the datasets 430" for the feature to be evaluated. Otherwise, if the evaluation model 424 does exist, the model manager 416 may use the evaluation model 424 to continue training using the selected subset of datasets 430".

In some embodiments, the model manager 416 may select or identify a testing dataset and a validation dataset from the subset of datasets 430". The model manager 416 may select, define, or otherwise assign a portion of the subset of datasets 430" as the testing dataset. In addition, the model manager 416 may select, define, or otherwise assign a remaining portion of the subset of datasets 430" as the validation dataset. The testing dataset may be used as input to the evaluation model 424 to generate a predicted output and the validation dataset may be used to as the expected output to check the predicted output against. The checking of the expected output form the validation dataset with the predicted output from inputting the testing dataset into the evaluation model 424 may be used to update the parameters of the evaluation model 424. With the definition of the testing and validation datasets, the model manager 416 may provide or pass datasets 430" corresponding to the testing dataset to the model applier 418 to apply to the identified evaluation model 424.

The model applier 418 executing on the data processing system 402 may apply at least one of the evaluation models 424 to the subset of datasets 430" (e.g., the test dataset). With the selection of the evaluation model 424, the model applier 418 may feed the subset of datasets 430" into the inputs of the evaluation model 424. In feeding, the model applier 418 may process the input dataset 430" in accordance with the parameters of the evaluation model 424. From processing with the evaluation model 424, the model applier 418 may produce or generate at least one output 434 for the input dataset 430". The output 434 may correspond to, identify, or otherwise measure a predicted usefulness, risk level, performance metric, health level, among others. For example, for an input dataset 430" with application-related data, the output 434 may identify a likelihood that a particular feature of the application is deprecated or in current use.

The model applier 418 may apply the parameters of the evaluation model 424 in accordance with the model architecture. For example, when the evaluation model 424 is an artificial neural network, the model applier 418 may process the input dataset 430" using the kernel weights of the artificial neural network to generate the output 436. The output may indicate a degree of usefulness, risk, performance, or health for the input dataset 430". When the evaluation model 424 is a clustering model, the model applier 418 may identify the output 434 from where the input dataset 430" is situated within a region of the feature space defined by the clustering model. The region may correspond to a classification for the input dataset 430" indicating usefulness, risk level, performance metric, or health level, among others.

Using the output 434, the model manager 416 may calculate, determine, or otherwise generate at least one feedback 436 for the evaluation model 424. The generation of the feedback 436 may be in accordance with the learning technique used to establish or train the evaluation model 424. In some embodiments, the model manager 416 may validate the evaluation model 424 using the output 434 and at least a portion of the datasets 430" (e.g., the validation dataset). When supervised learning is used, the model manager 416 may compare the output 434 from the input dataset 430" of the test dataset with the expected output. The expected output may be acquired or obtained from the validation dataset. Based on the comparison, the model manager 416 may determine the feedback 436 to indicate an amount of deviation between the predicted output 434 and the expected output. When unsupervised learning is used, the model manager 416 may determine a shift in parameters for the evaluation model 424 to use at the feedback 436. For instance, for a clustering model, the feedback 436 may indicate the amount that a centroid for a particular classification is to be modified based on the newly fed input datasets 430". According to the feedback 436, the model manager 416 may modify, change, or otherwise update the parameters of the evaluation model 424.

The model manager 416 may update and re-train the evaluation models 424 any number of times, and repeat the operations discussed above. For example, the model manager 416 in conjunction with the feature evaluator 414 may identify another subset of datasets 430" for a feature to be evaluated from another (e.g., subsequent) time period. With the identification, the model manager 416 may select the evaluation model 424 to process the subset of datasets 430". The model applier 418 may apply the selected evaluation model 424 to the subset of datasets 430" to generate the output 434. Using the output 434, the model manager 416 may determine the feedback 436 with which to update the parameters of the evaluation model 424. The data processing system 402 may switch between the training mode to retrain and update the evaluation model 424, and the runtime mode to apply the evaluation models 424 to newly acquired data.

Figure 5:
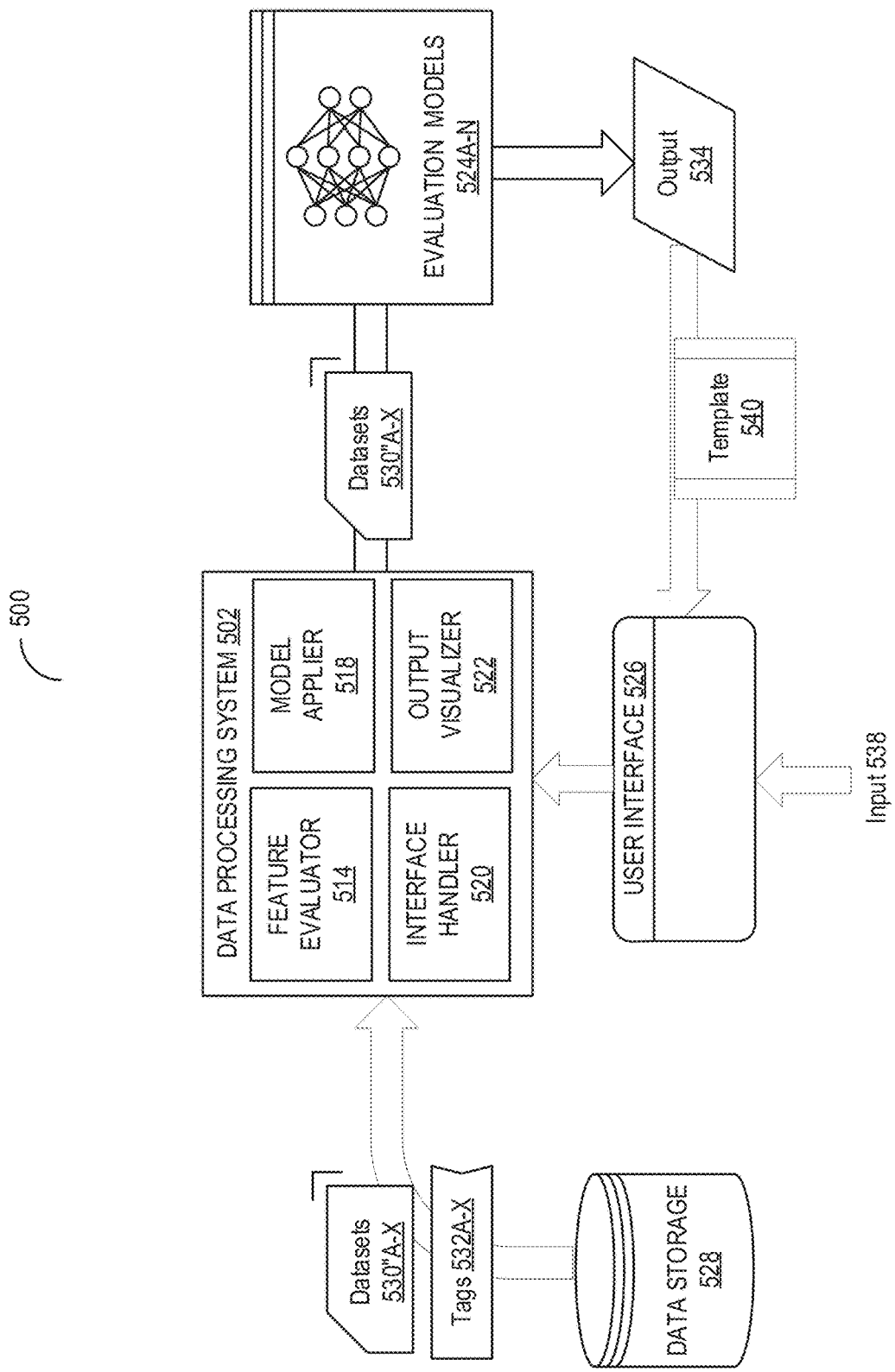
FIG. 5 depicts a block diagram of a system for processing aggregated data using ML models for output in accordance with an illustrative embodiment.

FIG. 5 depicts a block diagram of a system 500 for processing aggregated data using ML models for output. The system 500 may include at least one data processing system 502. The data processing system 502 may include at least one feature evaluator 514, at least one model applier 518, at least one interface handler 520, at least one output visualizer 522, one or more evaluation models 524A-N (hereinafter generally referred to as evaluation models 524), and at least one data storage 528, among others. In the system 500, the data processing system 502 and its components may be in a runtime or evaluation mode to apply at least one of the evaluation models 524 to new incoming data. Embodiments may comprise additional or alternative components or omit certain components from those of FIG. 5 and still fall within the scope of this disclosure. Various hardware and software components of one or more public or private networks may interconnect the various components of the system 500. Each component in system 500 (such as the data processing system 502 and its subcomponents) may be any computing device comprising one or more processors coupled with memory and software and capable of performing the various processes and tasks described herein.

The interface handler 520 executing on the data processing system 502 may provide the user interface 526 with which to select the feature to be evaluated using at least one of the evaluation models 524. The interface handler 520 may provide the user interface 526 for presentation on a display coupled with the data processing system 502 or a computing device (e.g., administrator's computing device) in communication with the data processing system 502. The user interface 526 may include one or more user interface elements (e.g., command button, radio button, check box, slider, or text box) for identifying or selecting the feature (or the topic category) to be evaluated. For instance, the user interface 526 may include a set of user interface elements corresponding to a menu of features from which the user can check or select for analysis.

With the presentation, the interface handler 520 may monitor the user interface 526 for at least one input 538 by the user. The interface handler 520 may use event handlers in the user interface elements of the user interface 526 to monitor. Upon detection of the input 538 on the user interface 526, the interface handler 520 may obtain, identify, or otherwise receive the selection of the feature to be evaluated. The input 538 may correspond to a user interface on the user interface element of the user interface 526. The feature may correspond to the user interface element in the user interface 526 on which the input 538 is detected.

The feature evaluator 514 executing on the data processing system 502 may identify or select a subset of datasets 530"A-X (hereinafter generally referred to as datasets 530")

using at least one feature for evaluation using at least one of the evaluation models 524. The feature may correspond to at least one topic category for the datasets 530" to be evaluated or analyzed for at least one metric, such as utility, risk level, performance, health, among others. The subset of datasets 530" may be obtained, received, or otherwise retrieved from over a period of time. The period of time may correspond to a sampling window over which the datasets were generated at each data source. The period of time for the datasets 530" for evaluation may differ from the period of time of datasets that were used to initialize, train, and establish the evaluation models 524.

In some embodiments, the feature evaluator 514 may select or identify the subset of datasets 530" using the selection of the feature via the user interface 526. In some embodiments, the feature evaluator 514 may find, select, or otherwise identify the tag 532 corresponding to the selected feature. The tag 532 may identify the topic category for each associated dataset 530". The topic category defined by the tag 532 may correspond to the feature to be evaluated for the metric (e.g., utility or risk level). With the identification, the feature evaluator 514 may select or identify the subset of datasets 530" using the tag 532 corresponding to the selected feature. In some embodiments, the feature evaluator 514 may identify the segment corresponding to the subset of datasets 530" (e.g., previously defined by the tag generator) stored on the data storage 528. The segment may correspond to the datasets 530" associated with the selected feature.

In conjunction, the feature evaluator 514 may identify or select the evaluation model 524 from the set of evaluation models 524 to be used to process the dataset 530". The selection may be based on the subset of datasets 530", the feature to be evaluated, or the topic category identified in the tags 532 of the selected subset, among others. For instance, each evaluation model 524 may be dedicated or configured to process subsets of datasets 530" for the selected feature or by extension category topic. In general, each evaluation model 524 may have: at least one input corresponding to the subset of datasets 530", at least one output from processing the input, and a set of parameters (e.g., weights) to process the inputs to generate the output. To train the evaluation model 524, the feature evaluator 514 may invoke the model applier 518 to apply the identified datasets 530".

The model applier 518 executing on the data processing system 502 may apply at least one of the evaluation models 524 to the subset of datasets 530" identified using the selected feature. With the selection of the evaluation model 524, the model applier 518 may feed the subset of datasets 530" into the inputs of the evaluation model 528. In feeding, the model applier 518 may process the input dataset 530" in accordance with the parameters of the evaluation model 524. From processing with the evaluation model 524, the model applier 518 may produce or generate at least one output 534 for the input dataset 530". The output 534 may correspond to, identify, or otherwise measure a predicted usefulness, risk level, performance metric, health level, among others. For example, for an input dataset 530" with application-related data, the output 534 may identify a likelihood that a particular feature of the application is deprecated or in current use.

The output visualizer 522 executing on the data processing system 502 may render, display, or otherwise present at least one visualization of the output 534 on the user interface 526 using at least one template 540 for the feature. The output visualizer 522 may identify or select the template 540 from a set of templates for the set of potential features and by extension the topic categories for the tags 532. The selection of the template 540 may be based on the selected feature, the topic categories for the tag 532 associated with the input dataset 530", the output 534 from the evaluation model 524, the evaluation model 524 used to generate the output 534, among others. Each template 540 may be pre-generated or pre-configured for presenting the information from the output 534.

In accordance with the template 540, the output visualizer 522 may create, produce, or otherwise generate the visualization of the output 534. The template 540 may define or specify a visualization of the information identified in the output 534. For example, the template 540 may specify the information (e.g., predicted usefulness, risk level, performance metric, or health level) as indicated in the output 534 to be presented in a bar graph, a table, a box plot, a scatter plot, a pie chart, a Venn diagram, histogram, or fan chart, among others. The template 540 may identify one or more user interface elements with which the user can use to drill down or navigate the information for the output 534. Using the specifications of the template 540, the output visualizer 522 may generate the visualization of the information as identified in the output 534. Examples of the visualizations are shown in FIGS. 7A-9E.

In this manner, the data processing system may reduce the amount of time and effort spent by user in trying to manually track down individual data sources to track and fetch data by retrieving datasets originally stored across disparate data sources in the network environment. With the ready retrieval of the datasets, the data processing system may transform the datasets in a manner amenable for processing by evaluation models. The ability to process the datasets for evaluation models can result in uncovering and detecting issues across multiple applications and processes in the network environment. With repeated training of the evaluation models using datasets with successive sampling periods, the data processing system may be able to provide more accurate and refined output.

Furthermore, the data processing system can also use the templates to produce visualizations for easy digestion via the dashboard information by the users. As such, problems affecting the performance of applications or processes on servers across the network may be quickly and readily pinpointed and addressed. In addition, the insight and information from these visualizations of the output may be used to assess and create a long-term (e.g., 1 to 10 years) strategy for improving performance and enhancing risk management of the overall network environment. The output generated by the data processing system may also improve the overall performance of the servers and client devices in the network, for instance, by reducing the computer and network resources tied up due to previously undetectable issues.

Figure 6:
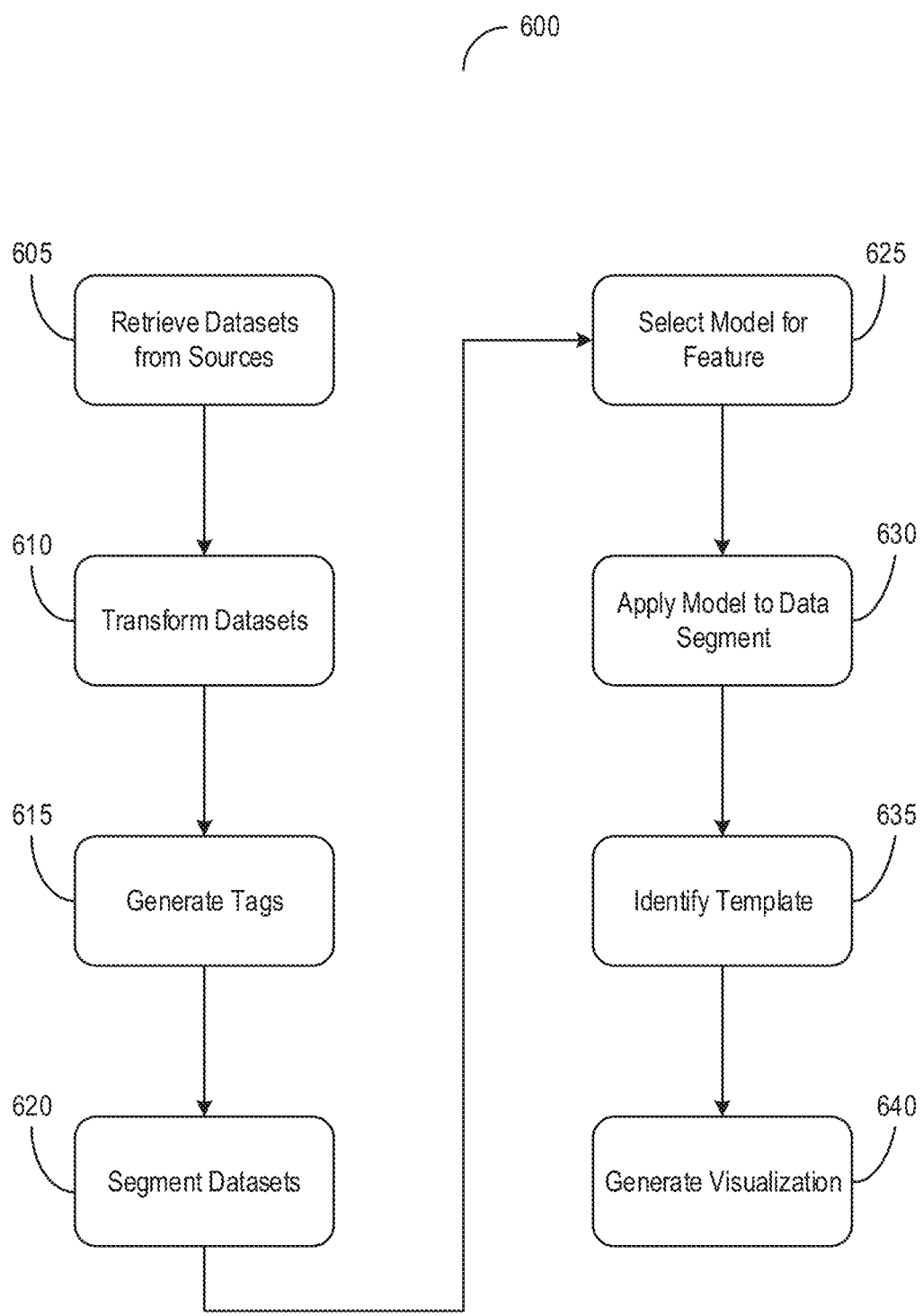
FIG. 6 depicts a flow diagram of a method of aggregating data from disparate sources to output information using ML models in accordance with an illustrative embodiment.

FIG. 6 depicts a flow diagram of a method 600 of aggregating data from disparate sources to output information using ML models. Embodiments may include additional, fewer, or different operations from those described in the method 600. The method 600 may be performed by a service (e.g., a data processing system) executing machine-readable software code, though it should be appreciated that the various operations may be performed by one or more computing devices and/or processors.

At step 605, a service may retrieve datasets from data sources. Each of the data sources may store and maintain datasets, in accordance to the specification of the data source. The specifications may include a format and contents for datasets to be stored and maintained at the data source. The data for the datasets may be generated by various applications, processes, and computing devices in the computing network (e.g., enterprise network). The service may retrieve the datasets from these data sources over a period of time.

At step 610, the service may transform the datasets retrieved from the data sources. Upon retrieval from the data source, the service may transform each dataset from the original formatting to a formatting for application to one of a set of machine learning models. In addition, the service may perform data correction or augmentation for missing data in the converted datasets. At step 615, the service may generate tags for each datasets using the contents (e.g., fields or values) of the dataset. The tag may identify a topic category for the dataset. At step 620, the service may segment the datasets by the topic categories as identified in the tags.

At step 625, the service may select a machine learning model for evaluating the dataset. The service may maintain a set of machine learning models. Each model may be dedicated to or configured to process datasets for certain topic categories. The service may select the model based on the feature or topic category to be evaluated. At step 630, the service may apply the selected model to the segment of datasets identified using the tags. In applying, the service may process the segment of datasets in accordance with the parameters of the machine learning model to generate an output.

At step 635, the service may identify a template with which to generate a visualization of the output from the machine learning model. The template may specify a form for visualizing the information identified in the output from the model. The template may be identified using the feature or topic category analyzed from applying the machine learning model to the segment of dataset. At step 640, the service may generate the visualization of the output in accordance with the template. With the generation, the service may present the visualization of the information of the output on a dashboard interface.

Figure 7C:
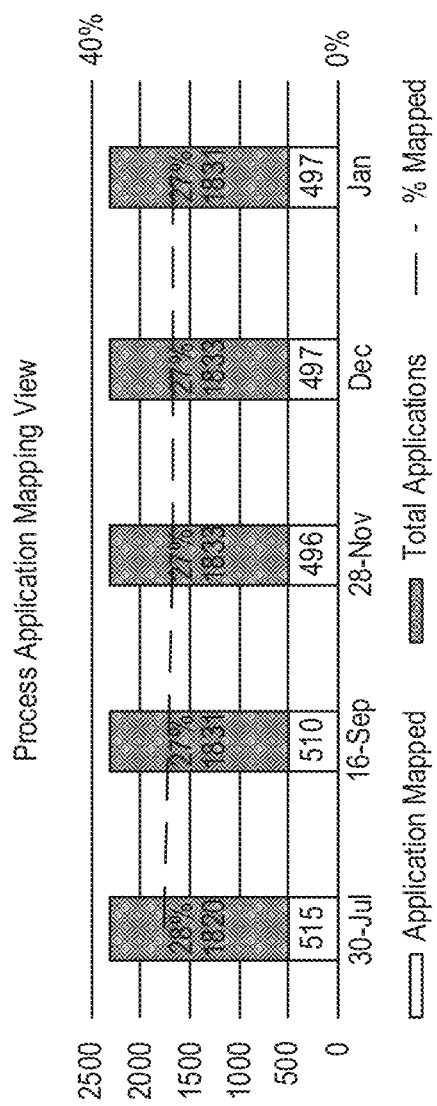

FIGS. 7A-C depict screenshots of visualizations 700-710 of processes and application mapping presented on a dashboard interface. The visualization 700 may provide a view of level 1 (L1), level 2 (L2), and level 3 (L3) processes in L1, L2, L3 business process taxonomy defined to have a common vocabulary for the classification of business processes that facilitates easier communication, governance, and reporting, helping improve diverse stakeholder alignment and managements in a table view. L1 may correspond to a lifecycle of services provided internally and externally through the enterprise and may be outside of a line (e.g., a process) and may be unique to a specific function (e.g., addition of a user). L2 may correspond to a logical order of processes directly underpinning the delivery of the L1 and may be not overly specific to a particular function or business or the same as a L1 (e.g., account opening and setup). L3 may correspond to unique and distinct processes needed to complete the L2 process, and may be anything other than a process step that is to connect to a L2 process (e.g., Know Your Customer (KYC) onboarding review). The visualization 705 may provide a view on a number of enterprise and sector applications mapped to distinct processes, among others, in a table view. The visualization 710 may provide the view of total applications which are mapped and not mapped to the process defined to services in a table view.

Figure 8A:
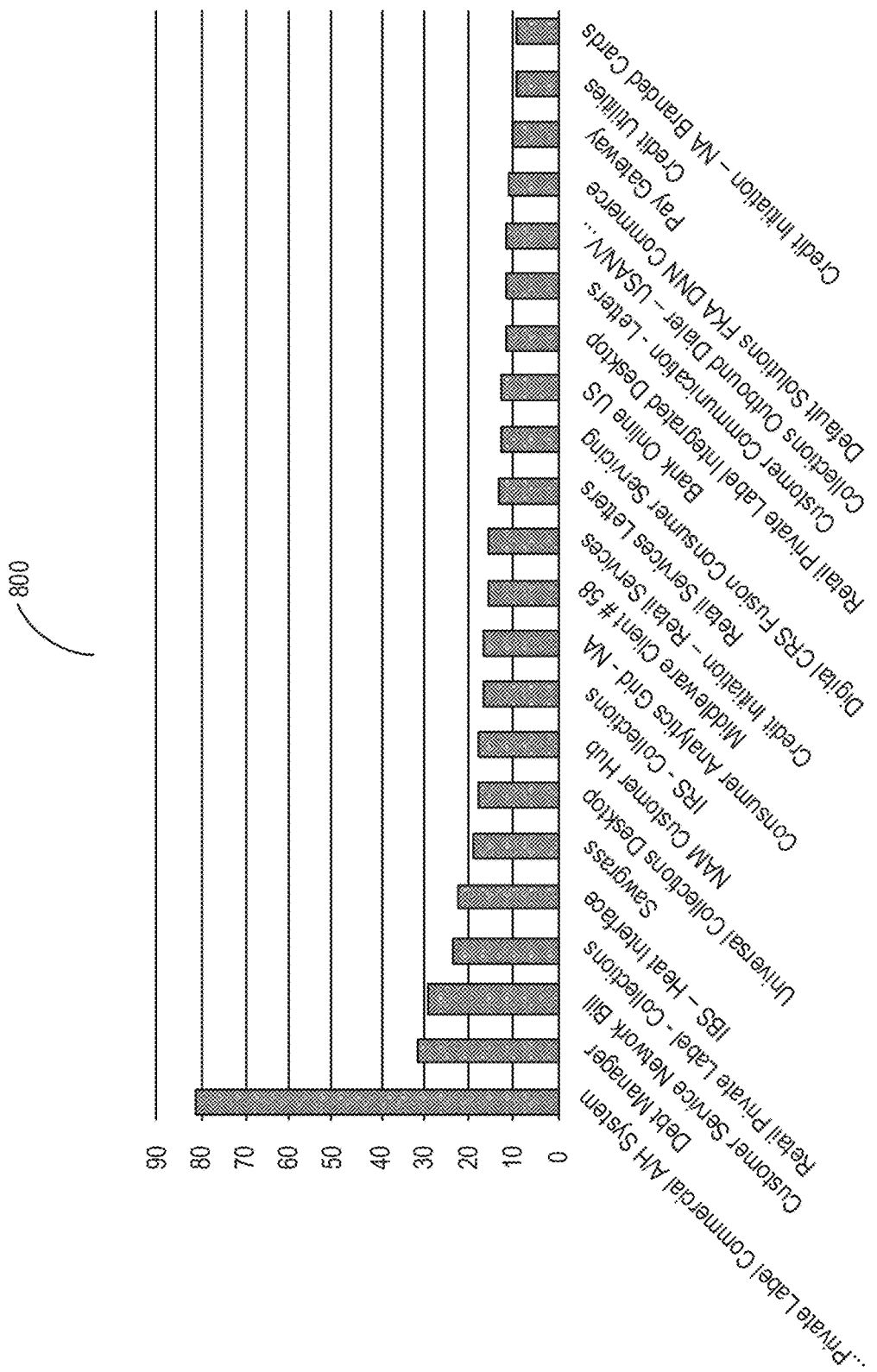
FIGS. 8A-C depict screenshots of information characterizing applications generated presented on a dashboard interface in accordance with an illustrative embodiment.
Figure 8B:
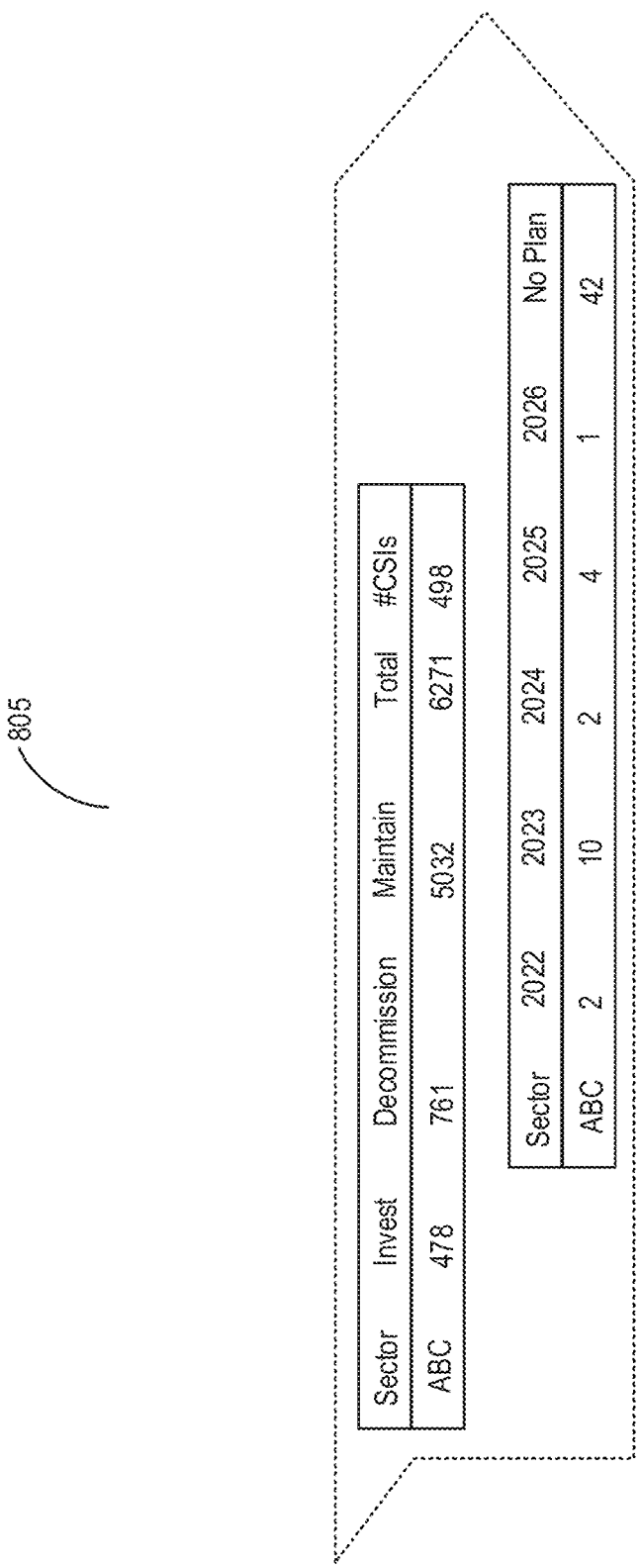
Figure 8C:
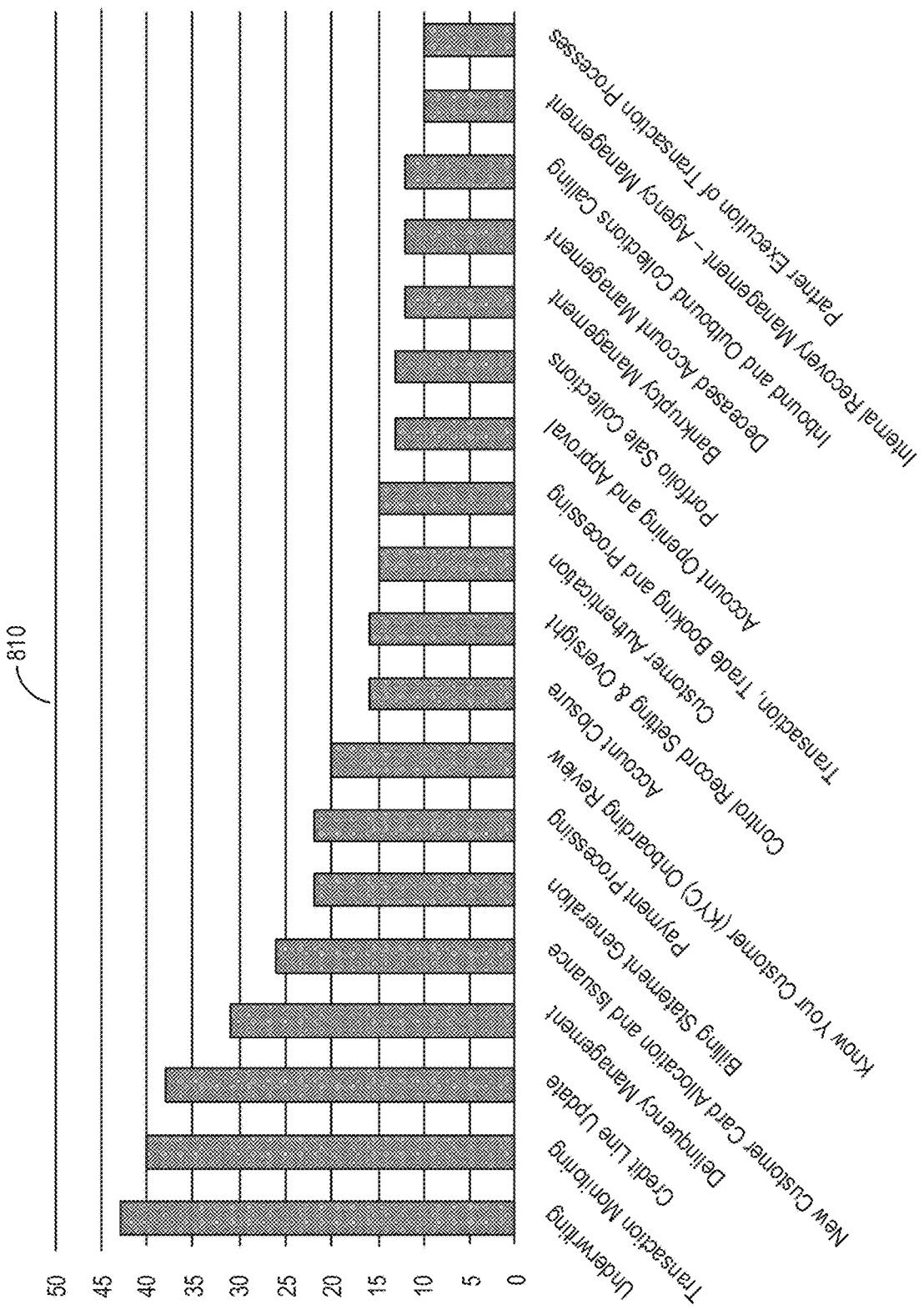
Figure 9A:
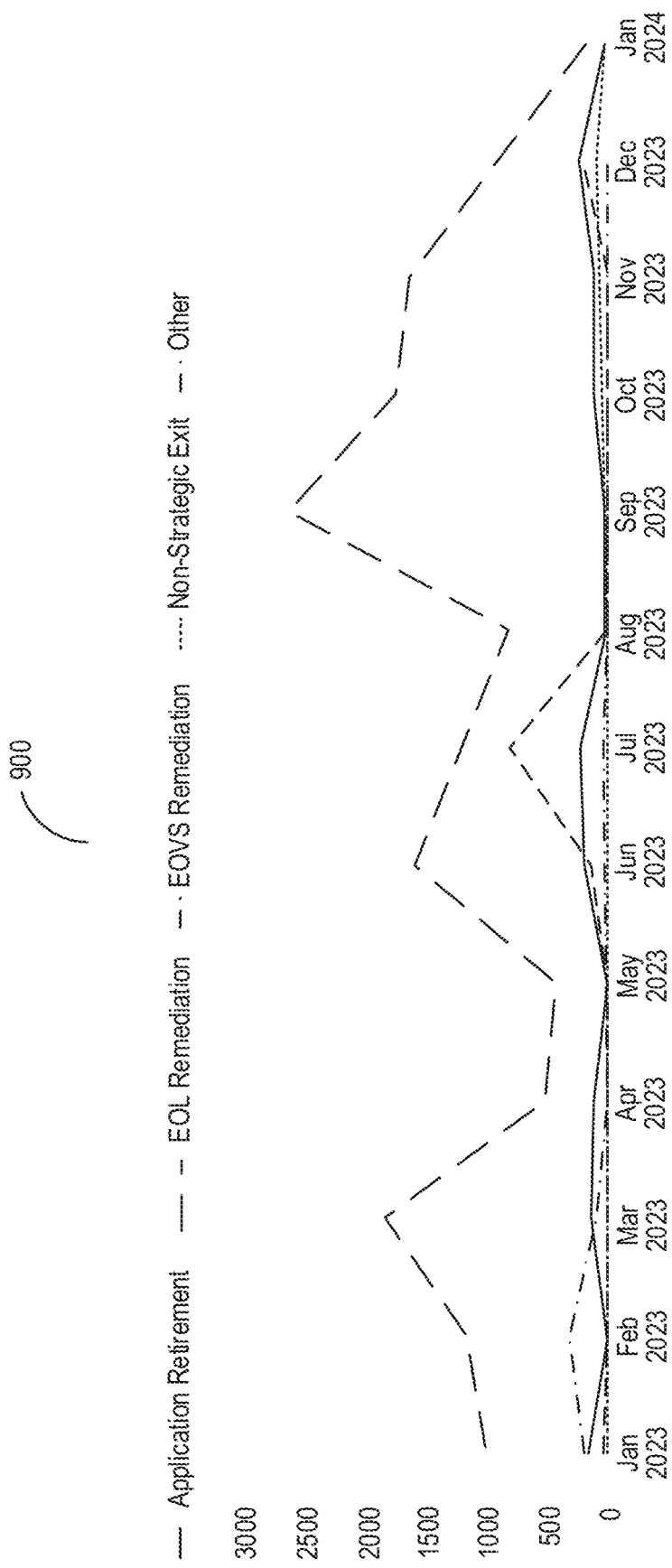
FIGS. 9A-E depict screenshots of information of risk factors from application processes presented on a dashboard interface in accordance with an illustrative embodiment.
Figure 9B:
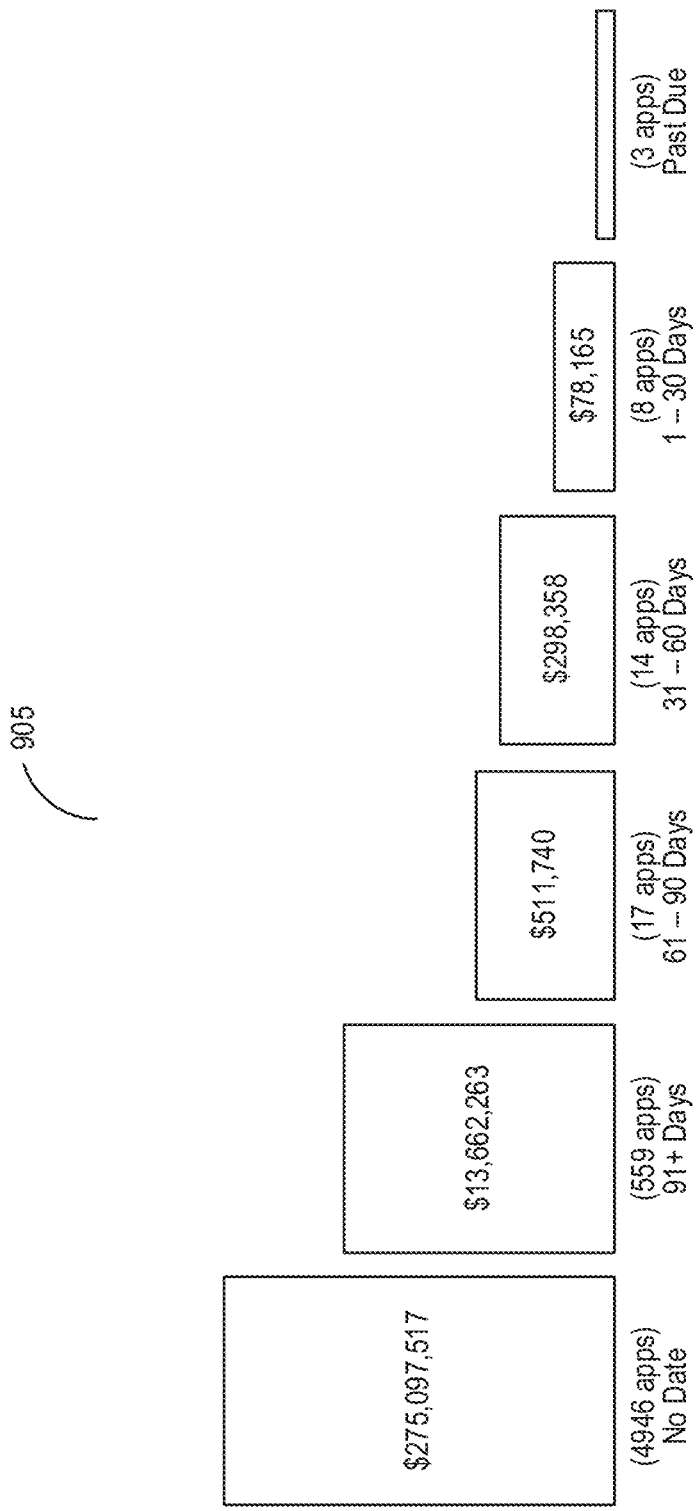
Figure 9C:
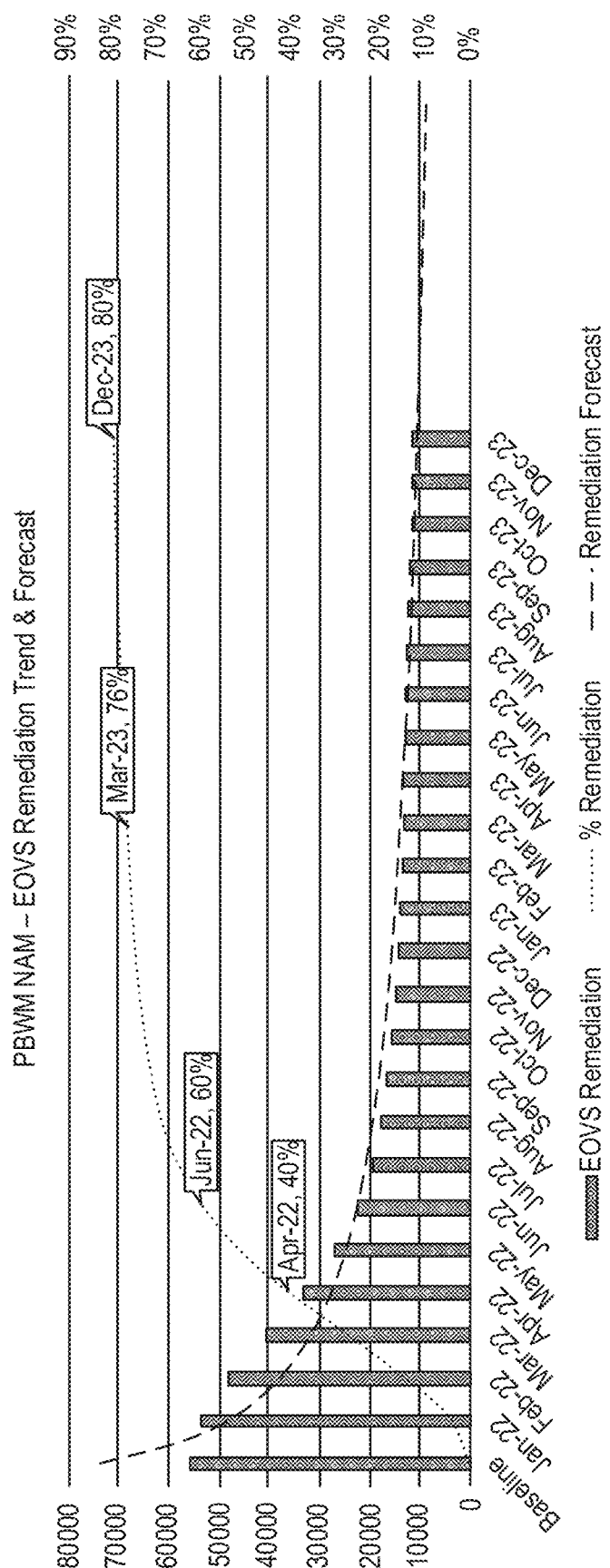
Figure 9D:
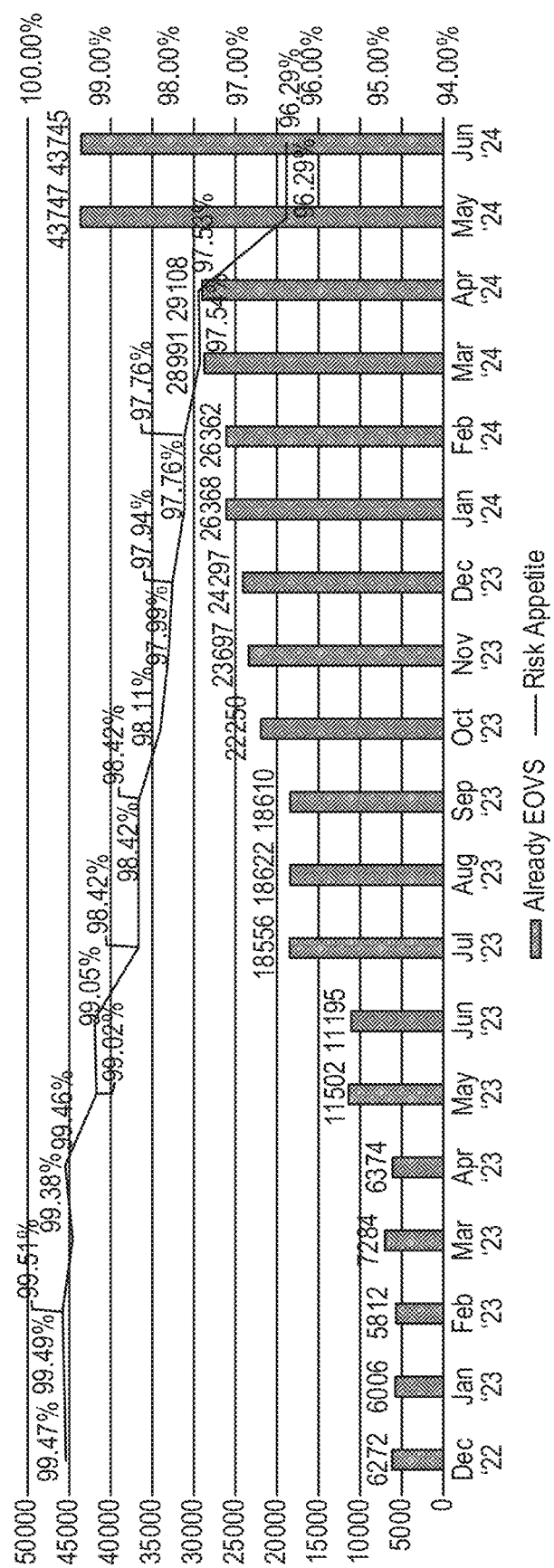
Figure 9E:
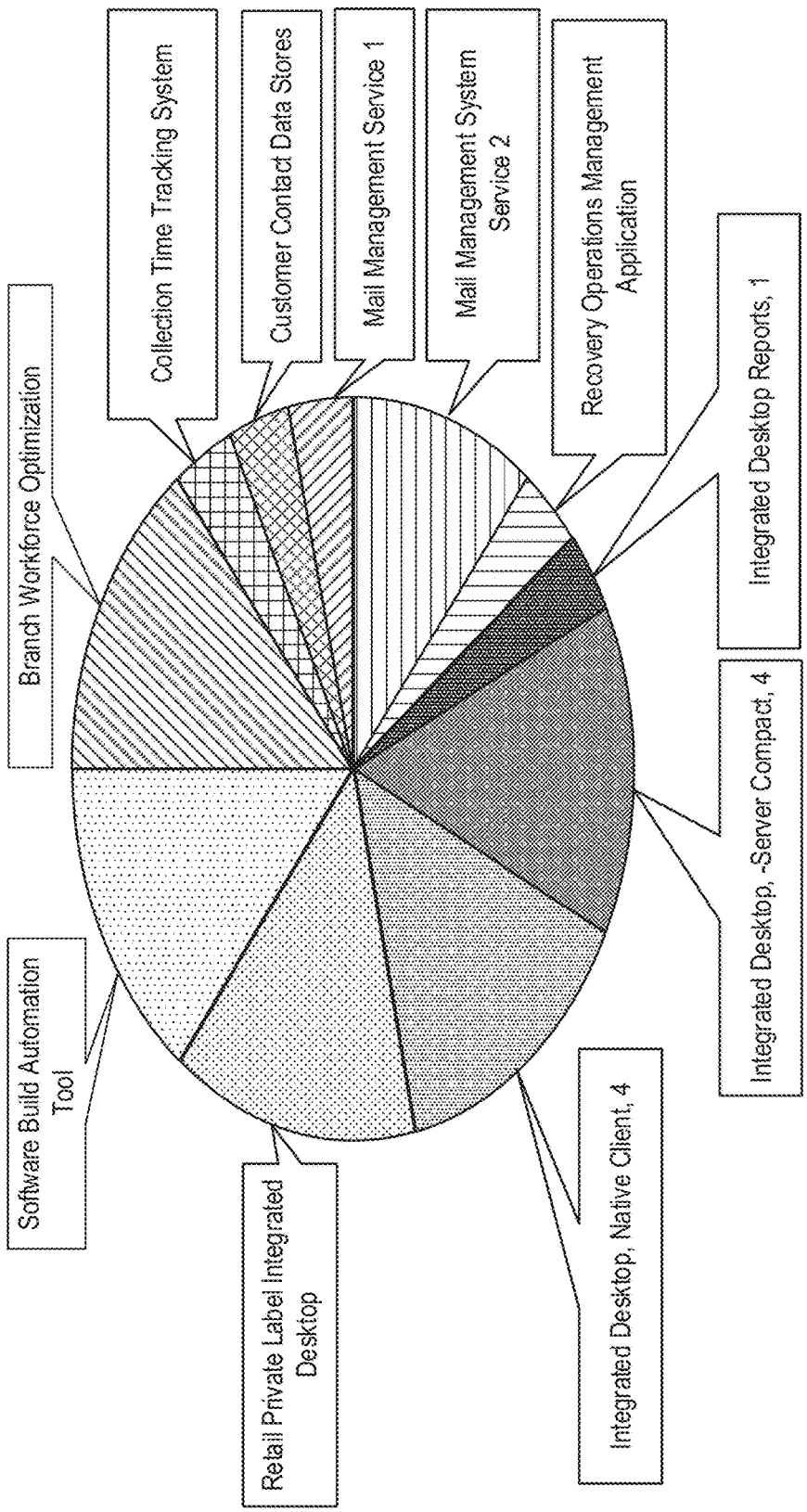

FIGS. 8A-C depict screenshots of visualizations 800-810 characterizing applications generated as presented on a dashboard interface. The visualizations 800-810 may identify how the applications can provide recommendations regarding process cycles, leveraging the evaluations models and insights. The visualization 800 may provide a histogram view of multiple technology applications supporting more than business functions for a particular line of and can identify opportunities to optimize as part of target state. The visualization 805 may be a timeline view of a number of applications to be decommissioned, maintained, or updated, among other statistics. The visualization 805 may identify mapping of functions such as (1) customer information collection, (2) customer account review, (3) account set up, and (4) checking creation and delivery along with tags of invest, decommission, or maintain. The visualization 805 may also provide how many applications can be decommissioned over time. The visualization 810 may provide a bar chart view of multiple processes that are supported by more than or equal to ten applications for a particular line or group in the enterprise.

FIGS. 9A-E depict screenshots of visualizations 900-920 of risk factors from application processes as presented on a dashboard interface. The visualization 900 may be a graph of the forecasting of application decommissions. The visualization 900 may show the forecast of retirement of applicable applications, remediation of application components that are end of life (EOL), remediation of application components that are end of vendor support (EOVS) and other decommissioning or remediation details for the next year. The visualization 905 may be a histogram, or multiple histograms, showing monetary values for retiring various applications. In the visualization 905, the summary of the application retirement status and the monthly chargeback details for applications that are past due and for applications that would be due within 180 days are visualized with the ingested data.

The visualization 910 may be a summary graph of trends and forecasts for remediating applications. The visualization 910 may provide the end of vendor support remediation projection for application components within a particular sector are depicted along with the projected trend and forecast for the EOVS remediation. The visualization 915 may be a graph of a risk appetite across time. The visualization 915 shows the risk appetite forecast against monthly open end of vendor support (EOVS) components. This chart forecast the risk appetite for the next 12 months and indicates the number of EOVS items that needs to be remediated to mitigate the risk (Risk Appetite: color 1>=99.4%, color 2 between 99.0% and 99.4% and color 3<99.0%). The visualization 920 may be a pie chart of component counts for various applications. In the visualization 920, the pie chart may list the impacted applications and the corresponding component count that are still end of vendor support (EOVS) from December 2015 and not yet remediate.

FIGS. 10A-D depict a flow diagram of a method 1000 for aggregating data related to applications and outputting information on application commission using ML models. Embodiments may include additional, fewer, or different operations from those described in the method 1000. The method 1000 may be performed by a service (e.g., a data processing system) executing machine-readable software code, though it should be appreciated that the various operations may be performed by one or more computing devices and/or processors. Starting from FIG. 10A, a service may access data from a data repository 1002. The data repository may include application tech data including information related to application, server, and data center, server costs, and application and service level agreements, among others. In conjunction, moving onto FIG. 10B, the service may access data from a sector data repository 1004). The sector data repository may include data for processes with functions and applications with functions from individual sectors 1 through n.

Figure 10A:
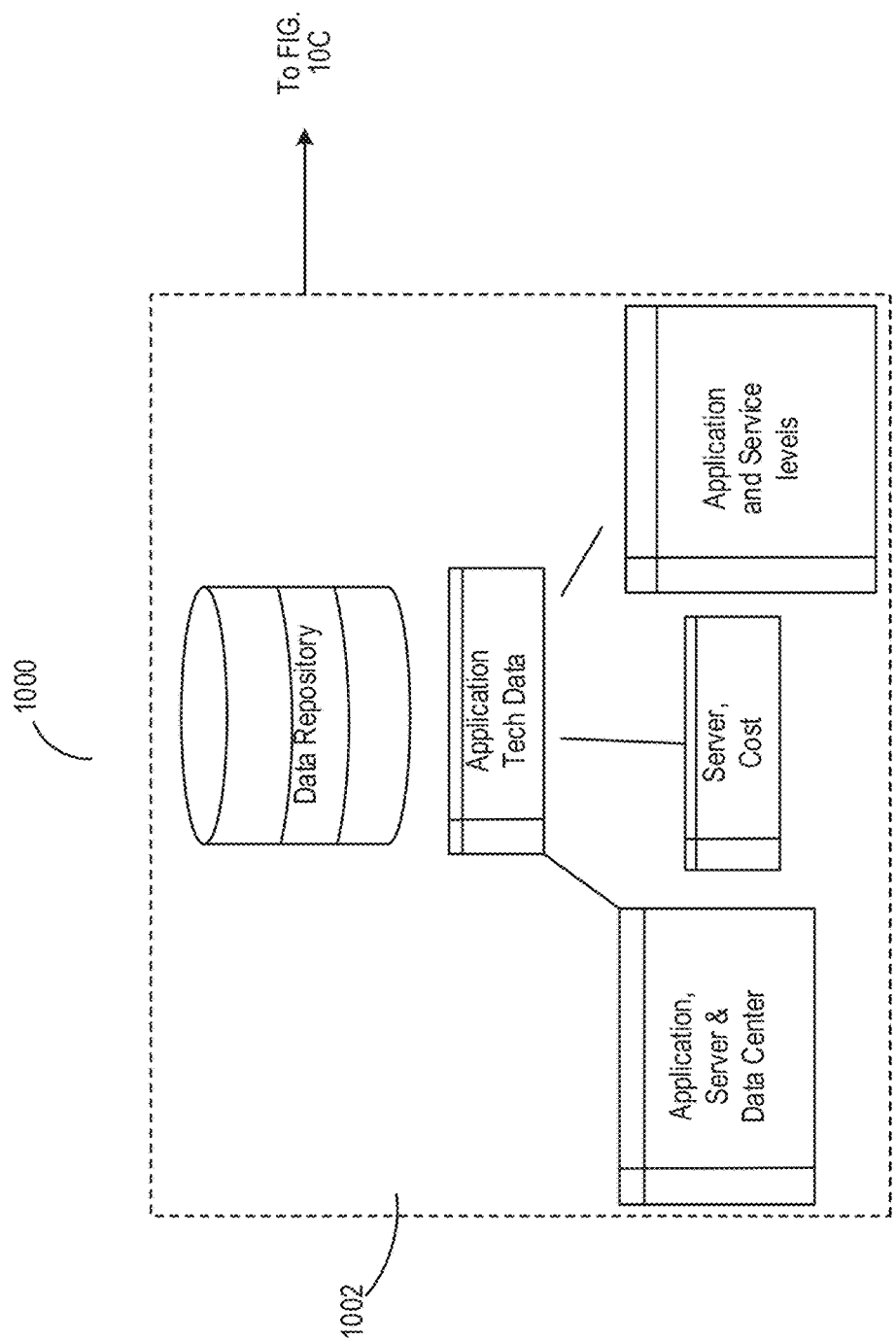
FIGS. 10A-D depict a flow diagram of a use case for aggregate data related to applications and outputting information on application commission using machine learning (ML) models in accordance with an illustrative embodiment.
Figure 10B:
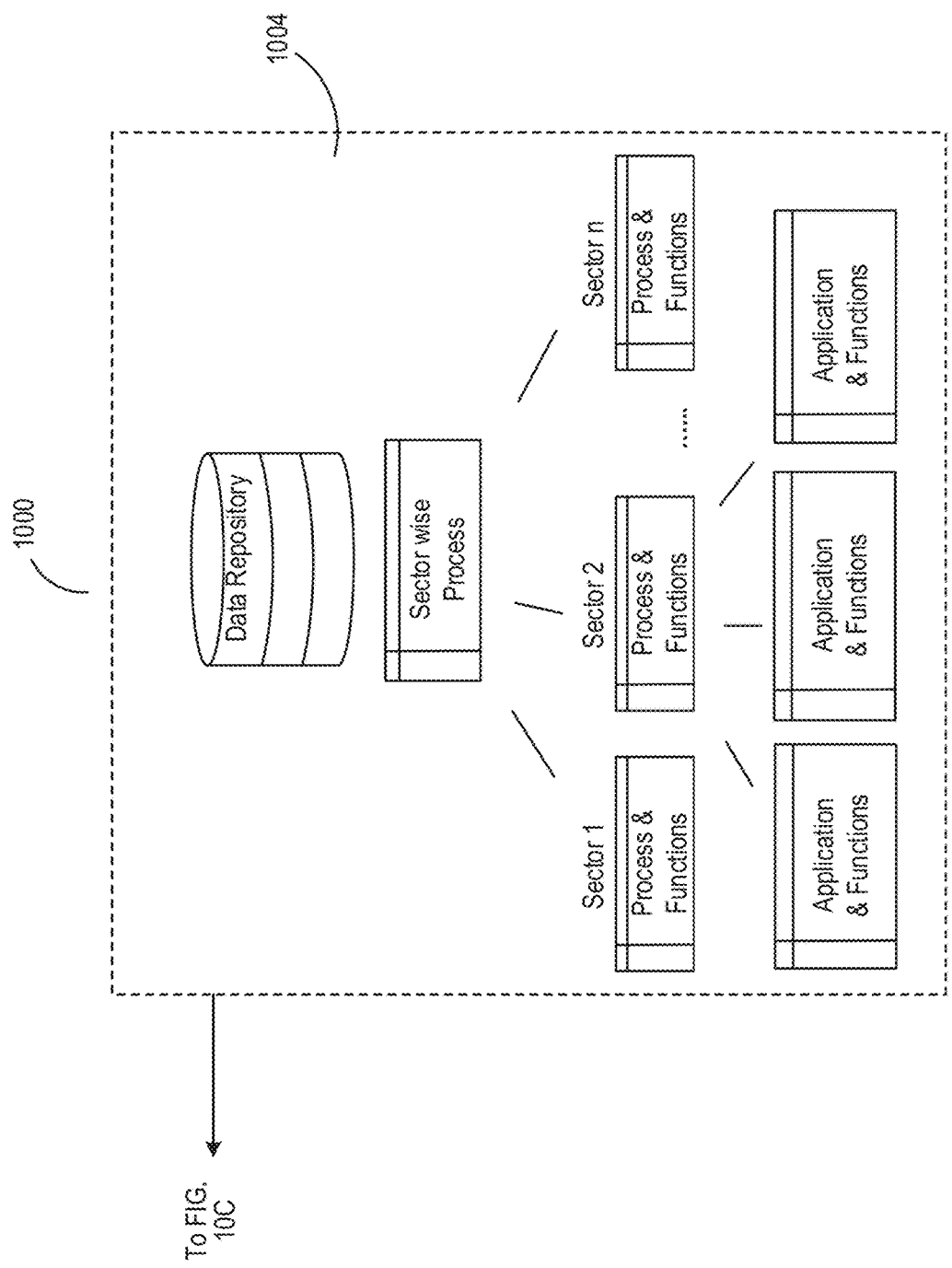
Figure 10C:
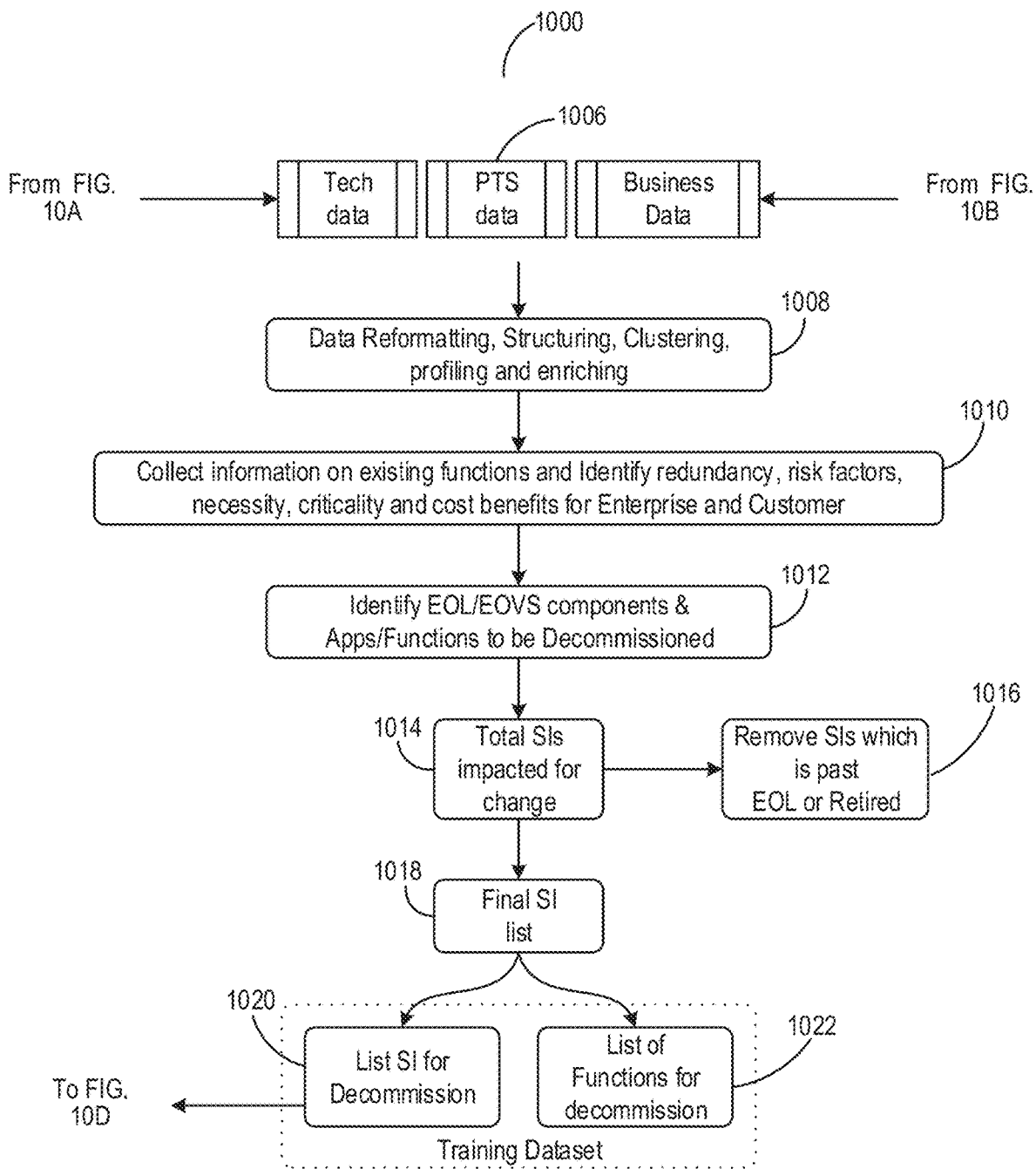

Continuing onto FIG. 10C, the service may aggregate the data from multiple data sources 1006. The data sources may include from the data repository 1002 or the sector data repository 1004, as well as from a project tracking system (PTS). The PTS may be a management tool used to create and maintain projects, budgets, forecast and actual in both full time equivalent (FTE), as well as the status and the start or end date for each project. The PTS may also allow managers to track resource allocation. With the aggregation, the service may reformat, structure, cluster, profile, and enrich the aggregated data 1008. In addition, the service may collect information on existing functions to identify redundancies, risk factors, necessity, criticality, and cost benefits for the enterprise network and customers 1010. The service may identify components, applications, and functions to be decommissioned in the aggregated data 1012. The components may be at an end of life (EOL) in which the component vendor has announced that maintenance and extended support is to be terminated. The components may be at an end of vendor support (EOVS) in which the vendor for the component announced that publicly available extended support is to end for a given product version. The service may determine a total number of system inventory items (Sis) impacted 1014. The SI may identify profiles of applications and may aggregate details from messages, user interfaces, infrastructure or software deployment details, and other information. From the total number, the service may remove SIs which are past the EOL or retired 1016. The service may then compile a final CSI list 1018. The service may generate training and validation datasets including a list of CSIs for commissions and a list of functions for decommission 1020 and 1022.

Figure 10D:
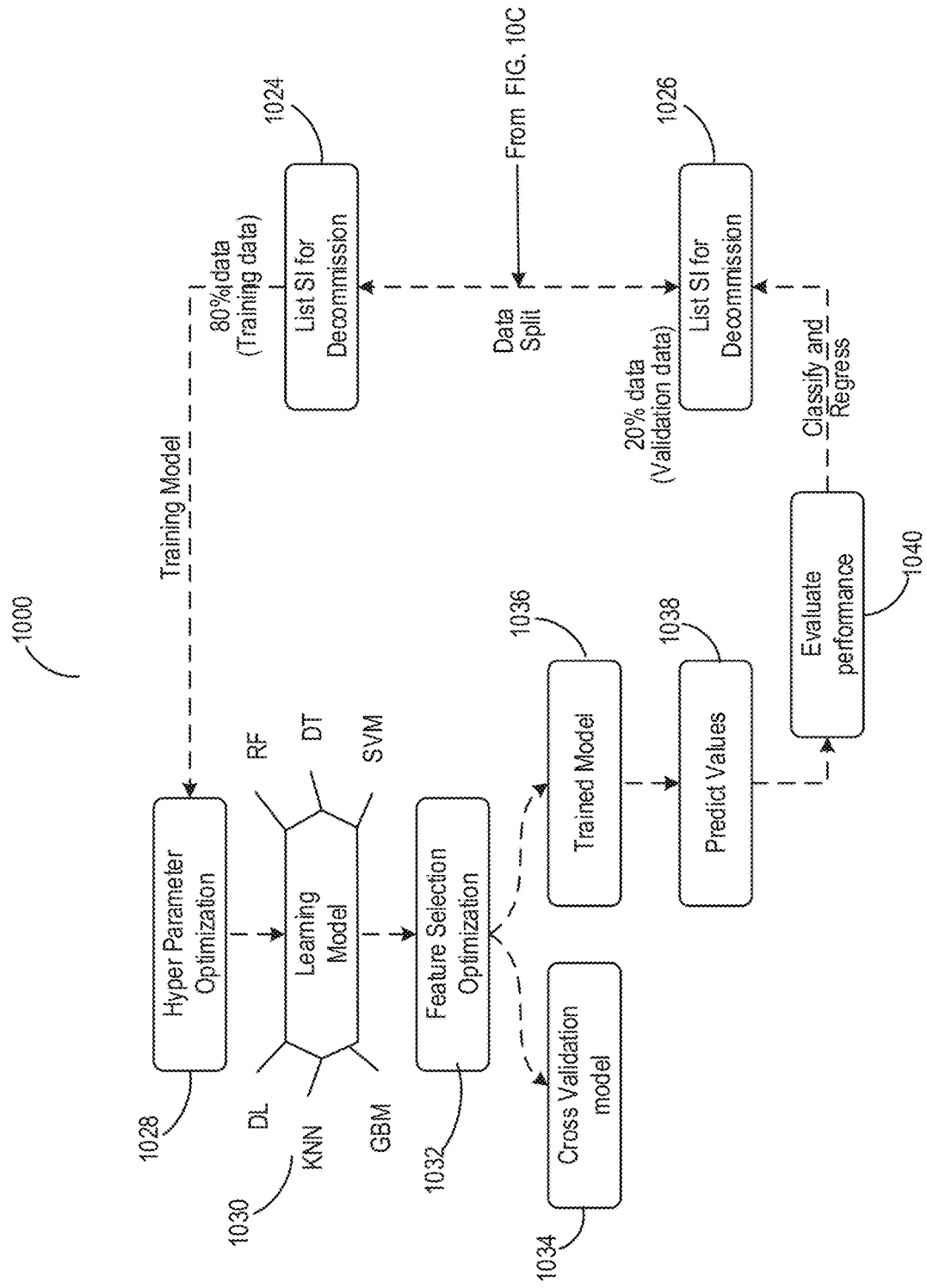

Referring now to FIG. 10D, the service may split the data by using the 80% of the list of CSI for decommission as training data 1024 and using the remaining 20% for validation (1026). The service may use the training dataset to perform hyper parameter optimization 1028. The service may use one or more learning models to train, such as a deep learning model, a nearest neighbors model, a decision tree, a radio frequency mode, a gradient boosting machine, or a support vector machine, among others 1030. The service may perform a feature selection optimization 1032 to derive a cross validation model 1034 and to generate a training model 1036. The service may use the trained model to generate predicted values 1038 and use the predicted values to evaluate performance 1040. The service may classify and regress the predicted values to add to the validation dataset.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer- readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of aggregating data from disparate sources to output information, comprising:
    maintaining, by a computing system, a plurality of machine learning (ML) models, each of the ML models corresponding to a respective function of a plurality of functions of one or more applications in use in a network environment;
    transforming, by the computing system, a first plurality of datasets of a plurality of data sources over a first time period by converting a first format of the corresponding data source for each of the first plurality of datasets;
    generating, by the computing system, from transforming the first plurality of datasets, a second plurality of datasets in a second format of the computing system corresponding to one of the plurality of ML models;
    identifying, by the computing system, from the second plurality of datasets, a subset of datasets using a function selected from the plurality of functions associated with a utility of the function in at least one of the one or more applications in use in the network environment;
    selecting, by the computing system, from the plurality of ML models, a ML model of the plurality of ML models based on the selected function, wherein the ML model is trained using a third plurality of datasets for the function from the plurality of data sources over a second time period;
    applying, by the computing system, the ML model to the subset of datasets corresponding to the function selected from the plurality of functions;
    generating, by the computing system, based on applying the ML model to the subset of datasets, an output including a metric for predicted usefulness indicating a degree of likelihood that the function is in use in at least one of the one or more applications in use in the network environment;
    identifying, by the computing system, from a plurality of templates corresponding to the plurality of functions, a template defining a visualization of the output based on the function; and
    causing, by the computing system, displaying of the visualization of the output including the metric indicating the degree of likelihood on a dashboard interface based on the template.

2. The method of claim 1, further comprising:
    receiving, by the computing system, via the dashboard interface, a selection of a plurality of categories for the plurality of functions to be evaluated; and
    generating, by the computing system, for each dataset of the second plurality of datasets, a tag identifying a category of the plurality of categories,
    wherein identifying the subset of datasets further comprises identifying the subset of datasets using the tag identifying the category of each dataset of the second plurality of datasets.

3. The method of claim 1, further comprising:
    responsive to determining, by the computing system, that more data is to be added to the subset of datasets associated with the utility of the function, retrieving, by the computing system, a second subset of data from the second plurality of datasets to supplement the subset of datasets.

4. The method of claim 1, further comprising:
    retrieving, by the computing system, a fourth plurality of datasets from the plurality of data sources over a third time period;
    identifying, by the computing system, a subset of ML models from the plurality of ML models corresponding to a subset of functions from the plurality of functions present in the fourth plurality of datasets; and
    re-training, by the computing system, the subset of the plurality of ML models using the fourth plurality of datasets.

5. The method of claim 1, further comprising generating, by the computing system, from the second plurality of datasets, a plurality of subsets of data corresponding to the plurality of ML models associated with the corresponding plurality of functions,
    wherein identifying the subset of datasets further comprise identifying the subset from the plurality of subsets based on the function selected from the plurality of functions.

6. The method of claim 1, further comprising:
    receiving, by the computing system, via the dashboard interface, a selection of the function from the plurality of functions associated with utility; and
    selecting, by the computing system, from the plurality of ML models, the ML model to be applied to the subset of datasets based on the selection of the function.

7. The method of claim 1, further comprising:
    retrieving, by the computing system, the first plurality of datasets from the plurality of data sources for the one or more applications over the first time period, each of the first plurality of datasets identifying at least one of a function type, a usage metric, a security risk factor, or a system criticality measure;
    identifying, by the computing system, from the second plurality of datasets transformed from the first plurality of datasets, a second subset of datasets and a third subset of datasets associated with an application of the one or more applications;
    training, by the computing system, the ML model using the second subset of dataset; and
    validating, by the computing system, the ML model using the third subset of datasets.

8. The method of claim 7, wherein applying generating the output further comprises generating the output identifying whether the function of the application is deprecated from use, and
    wherein causing further comprises causing the visualization of the output identifying for whether the function of the application is deprecated.

9. The method of claim 1, wherein maintaining the plurality of ML models further comprises maintaining the plurality of ML models comprising a first subset of ML models trained in accordance with supervised learning and a second subset of ML models trained in accordance with unsupervised learning.

10. A system for aggregating data from disparate sources to output information, comprising:
a computing system having one or more processors coupled with memory, configured to:
maintain a plurality of machine learning (ML) models, each of the ML models corresponding to a respective function of a plurality of functions of one or more applications in use in a network environment;
transform a first plurality of datasets of a plurality of data sources over a first time period by converting a first format of the corresponding data source for each of the first plurality of datasets;
generate, from transforming the first plurality of datasets, a second plurality of datasets in a second format of the computing system to one of the plurality of ML models;
identify, from the second plurality of datasets, a subset of datasets using a function selected from the plurality of functions associated with of a utility of the function in at least one of the one or more applications in use in the network environment;
select, from the plurality of ML models, a ML model of the plurality of ML models based on the selected function, wherein the ML model is trained using a third plurality of datasets for the function from the plurality of data sources over a second time period;
apply the ML model to the subset of datasets corresponding to the function selected from the plurality of functions;
generate, based on applying the ML model to the subset of datasets, an output including a metric for a predicted usefulness of the function indicating a degree of likelihood that the function is in use in at least one of the one or more applications in use in the network environment;
identify, from a plurality of templates corresponding to the plurality of functions, a template with which to visualize the output based on the function; and
cause displaying of a visualization of the output including the metric for the predicted usefulness of the function indicating the degree of likelihood on a dashboard interface based on the template.

11. The system of claim 10, wherein the computing system is further configured to:
receive, via the dashboard interface, a selection of a plurality of categories for the plurality of functions to be evaluated;
generate, for each dataset of the second plurality of datasets, a tag identifying a category of the plurality of categories; and
identify the subset of datasets using the tag identifying the category of each dataset of the second plurality of datasets.

12. The system of claim 10, wherein the computing system is further configured to:
responsive to determining that more data is to be added to the subset of datasets associated with the utility of the function, retrieve a second subset of data from the second plurality of datasets to supplement the subset of datasets.

13. The system of claim 10, wherein the computing system is further configured to:
retrieve, a fourth plurality of datasets from the plurality of data sources over a third time period;
identify a subset of ML models from the plurality of ML models corresponding to a subset of functions from the plurality of functions present in the fourth plurality of datasets; and
re-train the subset of the plurality of ML models using the fourth plurality of datasets.

14. The system of claim 10, wherein the computing system is further configured to:
generate, from the second plurality of datasets, a plurality of subsets of data corresponding to the plurality of ML models associated with the corresponding plurality of functions; and
identify the subset from the plurality of subsets based on the function selected from the plurality of functions.

15. The system of claim 10, wherein the computing system is further configured to:
receive, via the dashboard interface, a selection of the function from the plurality of functions associated with utility; and
select, from the plurality of ML models, the ML model to be applied to the subset of datasets based on the selection of the function.

16. The system of claim 10, wherein the computing system is further configured to:
retrieve the first plurality of datasets from the plurality of data sources for the one or more applications over the first time period, each of the first plurality of datasets identifying at least one of a function type, a usage metric, a security risk factor, or a system criticality measure;
identify, from the second plurality of datasets transformed from the first plurality of datasets, a second subset of datasets and a third subset of datasets associated with an application of the one or more applications;
train the ML model using the second subset of dataset; and
validate the ML model using the third subset of datasets.

17. The system of claim 16, wherein the computing system is further configured to:
generate, from applying the ML model, the output identifying whether the function of the application is deprecated from use; and
cause the visualization of the output identifying whether the function of the application is deprecated.

18. The system of claim 10, wherein the computing system is further configured to maintain the plurality of ML models comprising a first subset of ML models trained in accordance with supervised learning and a second subset of ML models trained in accordance with unsupervised learning.

* * * * *